(12) United States Patent
Marcotte

(10) Patent No.: US 6,449,614 B1
(45) Date of Patent: Sep. 10, 2002

(54) INTERFACE SYSTEM AND METHOD FOR ASYNCHRONOUSLY UPDATING A SHARE RESOURCE WITH LOCKING FACILITY

(75) Inventor: Scott T. Marcotte, Vestal, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/275,792

(22) Filed: Mar. 25, 1999

(51) Int. Cl.$^7$ .............................................. G06F 17/30
(52) U.S. Cl. .............................. 707/8; 707/1; 707/201; 711/141; 709/100; 709/108
(58) Field of Search .............................. 707/1–10, 100, 707/101, 102, 200, 201; 711/141–143; 709/229, 100–108

(56) References Cited

U.S. PATENT DOCUMENTS

| | | | |
|---|---|---|---|
| 4,980,852 A | 12/1990 | Giroir et al. | 364/900 |
| 5,285,528 A | 2/1994 | Hart | 395/725 |
| 5,305,448 A | 4/1994 | Insalaco et al. | 395/425 |
| 5,339,427 A * | 8/1994 | Elko et al. | 395/725 |
| 5,355,477 A | 10/1994 | Strickland et al. | 395/600 |
| 5,410,697 A | 4/1995 | Baird et al. | 395/650 |
| 5,734,909 A | 3/1998 | Bennett | 395/726 |
| 5,742,830 A * | 4/1998 | Elko et al. | 395/728 |
| 5,758,339 A | 5/1998 | Barton et al. | 707/8 |
| 5,774,731 A | 6/1998 | Higuchi et al. | 395/726 |
| 5,832,484 A * | 11/1998 | Sankaran et al. | 707/8 |
| 6,189,007 B1 * | 2/2001 | Boonie et al. | 707/8 |

OTHER PUBLICATIONS

IBM Technical Disclosure Bulletin, vol. 39, No. 6, Jun. 1996 pp 1–5.

IBM Technical Disclosure Bulleting, vol. 39, No. 12, Dec. 1996 pp 125–126.

Manabe, Y. et al "K–arbiter: a safe and general scheme for h–out of –k mutual exclusion" Theoretical Comp Sci vol. 193 No. 1–2 pp 97–112 Feb. 28, 1998 Inspec abstract 5848413.

Ford, D. "Mutual exclusion and synchronization in Java" Dr. Dobb's Journal, vol. 23, No. 1, pp. 62, 64, 66, 68–70, 73–75, Jan. 1998 Inspec abstract 5788491.

Hac, A. "On the modeling of shared resources with various lock granularities using queuing networks" Performance Evaluation, vol. 6, No. 2, pp. 103–115, Jul. 1986, Inspec abstract 2752416.

* cited by examiner

*Primary Examiner*—Hosain T. Alam
*Assistant Examiner*—Joon Hwan Hwang
(74) *Attorney, Agent, or Firm*—Shelley M Beckstrand

(57) ABSTRACT

Tasks make updates requested by calling tasks to a shared resource serially in a first come first served manner, atomically, but not necessarily synchronously, such that a current task holding an exclusive lock on the shared resource makes the updates on behalf of one or more calling tasks queued on the lock. Updates waiting in a queue on the lock to the shared resource may be made while the lock is held, and others deferred for post processing after the lock is released. Some update requests may also, at the calling application's option, be executed synchronously. Provision is made for nested asynchronous locking. Data structures (wait_elements) describing update requests may queued in a wait queue for update requests awaiting execution by a current task, other than the calling task, currently holding an exclusive lock on the shared resource. Other queues are provided for queuing data structures removed from the wait queue but not yet processed; data structures for requests to unlock or downgrade a lock; data structures for requests which have been processed and need to be returned to free storage; and data structures for requests that need to be awakened or that describe post processing routines that are to be run while the lock is not held.

20 Claims, 40 Drawing Sheets

```
Do forever:
 -Service→request=0
 -Service→ecb=0
 -rc=lock_Update Resource
    (&lock,qFuns,SERVICE,
    get_next_request,0,
    service,post_service_thread,
    0,rc)
 -if rc!=WORK_SYNC OR
    service→request is 0
    WAIT on service→ecb
 -<Process service→request>
```

FIG. 25

INTERFACE SYSTEM AND METHOD FOR ASYNCHRONOUSLY UPDATING A SHARE RESOURCE WITH LOCKING FACILITY

BACKGROUND OF THE INVENTION

1. Technical Field of the Invention

This invention pertains to an interface system and method. More particularly, it relates to a system and method for managing locks allowing asynchronous updates to a shared resource without task switching, wait or CPU spin.

2. Background Art

Computing systems provide structures and methods for protecting updates to data structures and objects contained in computer memory. This is typically done by updating a shared resource held in computer memory while holding an exclusive lock (thus guaranteeing an atomic update of the resource). Such systems generally require that tasks requiring access to data structures or objects wait to update the data structure or object until the exclusive lock is granted, thus often requiring suspension of the waiting tasks under circumstances which may cause introduction of an error into the system.

Consequently, there is a need in the art for a system and method for eliminating or reducing task waiting for locks to improve performance of the system. It is also desirable to allow for updates to be made to a shared resource without making a task wait for an exclusive lock, if the task is prevented for some reason or another from waiting. Such a task may not be able to be suspended while waiting for a lock without introducing an error of some kind into the system.

It is an object of the invention to provide an improved system and method for managing locks.

It is a further object of the invention to provide a system and method for managing locks with improved performance.

It is a further object of the invention to provide a system and method for managing locks which avoids formal task suspension or CPU spins.

It is a further object of the invention to provide a system and method for managing locks which avoids costly lock contention overhead.

It is a further object of the invention to provide a system and method for managing locks both synchronously and asynchronously.

SUMMARY OF THE INVENTION

In accordance with the system and method of the invention, applications update resources with exclusive locking without task suspension or task switching by selectively queuing update requests for execution on behalf of a first task by a second task holding a required lock.

Other features and advantages of this invention will become apparent from the following detailed description of the presently preferred embodiment of the invention, taken in conjunction with the accompanying drawings.

BRIEF DESCRIPTION OF THE DRAWINGS

FIG. 8 is a flow diagram of the MVS_unlock routine, which is called any time a ask tries to release a lock and it finds there are wait elements on the wait queue or the lock state has the LOCKED bit on.

FIG. 25 is pseudo code representation of the flow of execution of a service thread.

BEST MODE FOR CARRYING OUT THE INVENTION

Figure 1:
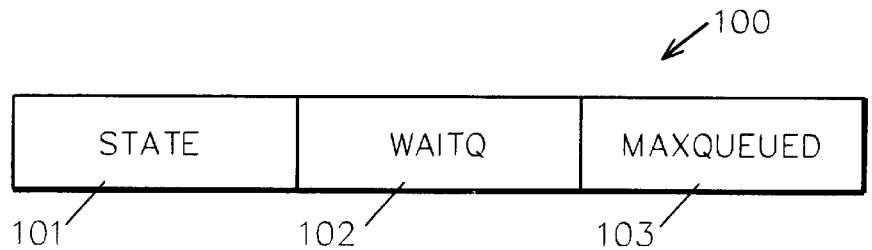
FIG. 1 is a diagram of a lock.

In accordance with the preferred embodiment of the invention, an interface system and method is provided that allows tasks to make updates to shared resources serially in a first come first served manner, atomically, but not necessarily synchronously. This interface system and method describes updates to be made in such a manner that it is not required that the calling task be the task that actually makes the updates. Thus, updates may be made asynchronously with respect to the calling task.

In most standard lock packages, tasks waiting for a lock are represented by some data structure and placed on a queue of some sort. In accordance with the preferred embodiment of this invention, a description of an update to be performed on behalf of a calling task is queued, rather than placing the calling task in a wait state if a required lock is held by a current task. This means the update will be performed asynchronously with respect to the calling task but the calling task never has to wait. Rather, the current task runs the update on behalf of the calling task before it (the task currently holding the lock) releases the lock, thus guaranteeing the update is made atomically, serially, and in a first come first served manner.

In accordance with an alternative embodiment of the invention, the number of applications able to use the asynchronous update system and method of the invention is increased by implementing it in conjunction with a standard synchronous (prior art) locking facility.

A resource in computer memory is protected by a lock. Typically, the lock is 3 computer words. The total amount of bytes is dependent on the hardware. For example, for the IBM MVS operating system a three word lock requires twelve bytes of storage.

An application initializes the lock via the following function call:
lock_Init(@_of_lock, Max_Queuing)
where:
   @_of_lock is the address of the lock that protects the resource. Max_Queuing is the maximum amount of queuing that is allowed to be done for asynchronous updates to the resource. This can be set to a special value of −1 if the caller wants unlimited queuing.

As previously mentioned, standard (prior art) locking mechanisms are also supported by the preferred embodiment of the invention. For example, the caller could get the lock in a write or read mode, and be suspended if it cannot get the lock immediately via the following calls:
lock_ObtainWrite(@_of lock)
lock_ObtainRead(@_of lock)
lock ReleaseWrite(@_of lock)
lock ReleaseRead(@_of lock)
where:
   @_of_lock is the address of the lock that protects the resource.

In accordance with the preferred embodiment of the invention, to allow for asynchronous update mode, the caller specifies functions to be called that will perform the various updates. For example, if the caller wants to add or remove from a linked list, two functions: add_list and remove_list would be defined to the asynchronous update facility. More complicated data structures would have more functions defined.

An additional feature of the preferred embodiment of the invention allows the caller to define different types of system tasks that are permitted to update a resource. This is important since the update may be performed by a different type of task than the calling task. For example, in MVS there are standard tasks and tasks represented by system request blocks (SRBs) that have different programming environments. Another example occurs in multi-language applications where tasks are running code from different programming languages. This allows different tasks to make the updates to the resource but not necessarily run the exact same routine. For example, an add to a linked list operation would have different code for a task running C language code than one running assembler code, yet they both may need to update the same list. Also, as will be described by way of example hereafter, it may be useful to classify tasks to allow for solution of a problem using the asynchronous update facility.

Another feature of the interface of the preferred embodiment of the invention enables a function to be executed after an update is made to the shared resource and the lock has been released. This is necessary to reduce lock contention. Updating a resource might require additional processing based on the state of the resource when the lock was held, but that processing does not need to be done while holding the lock. For example, the remove from a linked list might need to physically remove an object from a linked list while holding a lock and then return that object to free storage. Lock contention is reduced by returning the object to free storage after releasing the lock that protects the list.

Other features of the preferred embodiment of the invention include the ability to specify parameters the lock facility is to pass to the update routines, and also the ability to pass information between the function used to update the resource and the function that performs post processing while the lock is not held.

Asynchronous Update Facility Interface Structure

The asynchronous update facility interface structure of the preferred embodiment of the invention includes a set of functions and related task types that represent the possible types of updates to a resource. These functions and task types are saved in a structure that contains a two dimensional array of function pointers. Each function is numbered and represents a row in the array. Each task type is numbered and represents a column.

The routine to allocate a function array has the following template:
lock_allocate_function_array(work_types, task_types)
where:
   work_types is the number of different update or post processing routines that could possibly update or process the protected resource.
   task_types is the number of different defined task types for the tasks that could possibly update the protected resource.

The lock_allocate_function_array routine returns the address of a structure that contains the storage for the two dimensional array. In a linked list example where there is only one task type, work_types would be 3 (for add, remove, and return to free storage) and task_types would be 1.

Every function that is defined to the lock facility (whether that function is run while holding the lock, or is a post processing function run after the lock is released) has the following template:

procedure <routine_name>(sync_flag, task_type, prc_arg1, arg2)

where:
- routine_name is the name of the procedure or function.
- sync_flag is an indication passed by the lock facility to the function that indicates if it is being called from the same task that made the update request. This either has the value TRUE or FALSE.
- task_type is an indication to the function of what type of task is running this function. Since updates to the resource may be made asynchronously, the update function may be run on a different defined task type than that of the caller.
- prc_arg1 is prior return code or argument number 1. If the function is a resource update function that is run while holding the lock then this is the first user supplied argument. If it is a post processing routine then this is the return value that is provided by the update function. This is a machine word, on MVS it is 4 bytes of information, which can contain an address of storage or some other relevant value.
- arg2 is, if this is a resource update function that is run while holding the lock, the second user supplied argument; if this is a post processing routine it is the only user supplied argument to the routine.

These functions are defined to return a return code, implemented, for example, as a machine hardware word. The function updating a resource (the function that is run while holding the lock to that resource) passes the return code prc_arg1 to the post processing function (a.k.a., routine), which allows communication between the resource update function and the post processing function. The following special return codes are defined:

WORK_NOPOSTWORK (−1) If the resource update function returns this return code, the post processing routine (if specified) will NOT be called. This allows bypass of the post processing routine and saves the path length that is required for the function call.

WORK_DONTUNLOCK (−2) This return code tells the lock facility to not unlock the resource after it runs the resource update function. Normally the lock facility releases the lock after it runs a resource update routine. This return code will leave the lock held (which means that the calling code must ensure it gets released at some time). This return code allows resource update calls to use nested locking, an important feature of the preferred embodiment of the invention. Often times it is necessary to obtain more than one lock while updating a resource. The use of this return code allows for multiple lock obtains before updating a shared resource asynchronously. The examples described hereafter show the use of this feature, which is essential for nested asynchronous locking.

A calling application specifies the function to use for each type of task via the following function call:

lock_register_workunit(work_type, task_type, function, function_array)

where:
- work_type is the number (0, 1, . . . ) assigned to this type of update by the programmer.
- task_type is the number assigned to the type of task associated with the function.
- function is the address of the function.
- function_array is the address of function array to which this function is to be added. This is the address returned from lock_allocate_function_array.

In a linked list example, the programmer may choose to assign a work_type of 0 to the add to linked list function, of 1 to the remove from linked list function, and of 2 to the return to free storage function. There is only one task type (0). Thus three calls would be needed to the lock_register_workunit function call to define the functions for this linked list example.

To use the interface structure of the preferred embodiment of the invention, a program is written to include the update functions, a single call to the lock_allocate_function_array routine, and then N calls to the lock_register_workunit routine, where N is the number of update types times the number of task types. The resource may then be asynchronously updated repeatedly, using the following interfaces, until program termination without task suspension.

Resource update is accomplished via the following interfaces:

lock_UpdateResource(@_of_lock, @_of_functionarray, task_type, work_type, arg1, arg2, post_work, post_arg, rc)

where:
- @_of_lock is the address of the lock that protects the resource.
- @_of_functionarray is the address of the defined function array that contains the set of updates to the resource.
- task_type is the type of task that is making the call.
- work_type is the number assigned to the update to be performed(this with task_type indicates the function to run to update the resource).
- arg1 is a first user supplied argument.
- arg2 is a second user supplied argument.
- post_work is the number assigned to the post processing routine that is called some time after the update function (specified by work_type) but while NOT holding the associated lock. If a post processing routines is required, the caller specifies the special value of NO_FUNCTION (−1) which means there is no post processing to be performed.
- post_arg is a user supplied argument to the post processing routine.
- rc is The return code from the call. This indicates whether the resource was updated synchronously by the calling task (no lock contention) or it is being dispatched on the current task holding the lock (asynchronous), just in case the caller want to know this information.

Calling a function entails some path length for linkage overhead. Described next are fast path interfaces that lock the resource and let the caller update it in line if the lock is free and if not then the function is called asynchronously. This is more work for the programmer but it allows elimination of linkage overhead for the function call, and allows asynchronous update to entail no more path length than standard prior art locking in the case where there is no lock contention. (Of course when there is lock contention, asynchronous update will handle the contention much faster than the synchronous update process).

These fastpath interfaces are shown below:

lock_Resource(@_of_lock, @_of_functionarray, task_type, work_type, arg1, arg2, post_work, post_arg, rc)

The lock_Resource interface uses the same arguments as defined above for lock_UpdateResource, with an additional return code, as follows:

WORK_INLINE which means the lock is obtained in exclusive mode but the update function was not run because there was no contention for the lock. The caller then updates the resource in line after the function call.

unlock_Resource(@_of_lock, @_of_functionarray, task_type, post_work, post_arg, rc)

The unlock_Resource interface unlocks the resource and returns WORK_INLINE if the lock was released without contention. The caller would then have to run the post processing code in line. Otherwise the post processing work was queued for another task to perform.

Referring now to the drawings, a preferred embodiment of the asynchronous resource update facility of the invention is described in connection with a synchronous resource update facility. By combining asynchronous and synchronous facilities in this matter, greater flexibility is provided. As will be apparent to those skilled in the art an asynchronous facility may be provided without provision for synchronous resource update.

Data Structures

Referring to FIG. 1, lock 100 is defined by three machine words, state 101, waitq 102, and maxqueued 103. In the IBM MVS operating system, there are four bytes per word. State 101 includes state bits that define the state of the lock. Waitq is the anchor for wait queue 404 (FIG. 36), a LIFO queue of waiting tasks (synchronous prior art lock waiters) or resource updates (asynchronous updates). Maxqueued 103 specifies the maximum number of queued update requests allowed before asynchronous update calls will be made to wait. A maxqueued value of −1 indicates unlimited.

Figure 2:
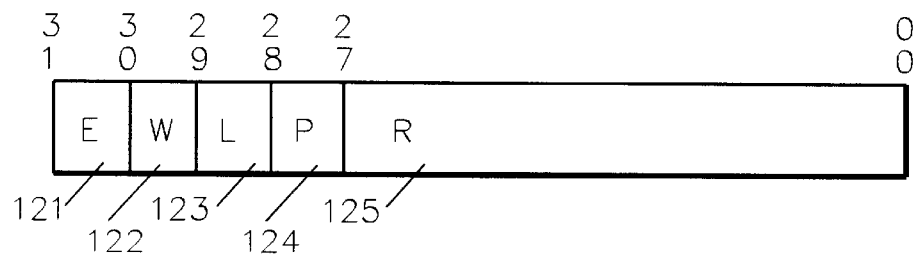
FIG. 2 illustrates the state field of the lock of FIG. 1.

Referring to FIG. 2, state 101 includes a 32 bit word including E 121, W 122, L 123, P 124 and R 125 values, where a bit in field E 121 indicates that lock 101 is held exclusive (write); a bit in field W 122 indicates that the wait queue is not empty; a bit in field L 123 indicates that the lock is held in a higher priority state; a bit in field P 124 indicates that asynchronous update requests must wait rather than queue the update since maxqueued has been reached or exceeded. Field R 125 contains the count of readers that hold the lock.

Figure 3:
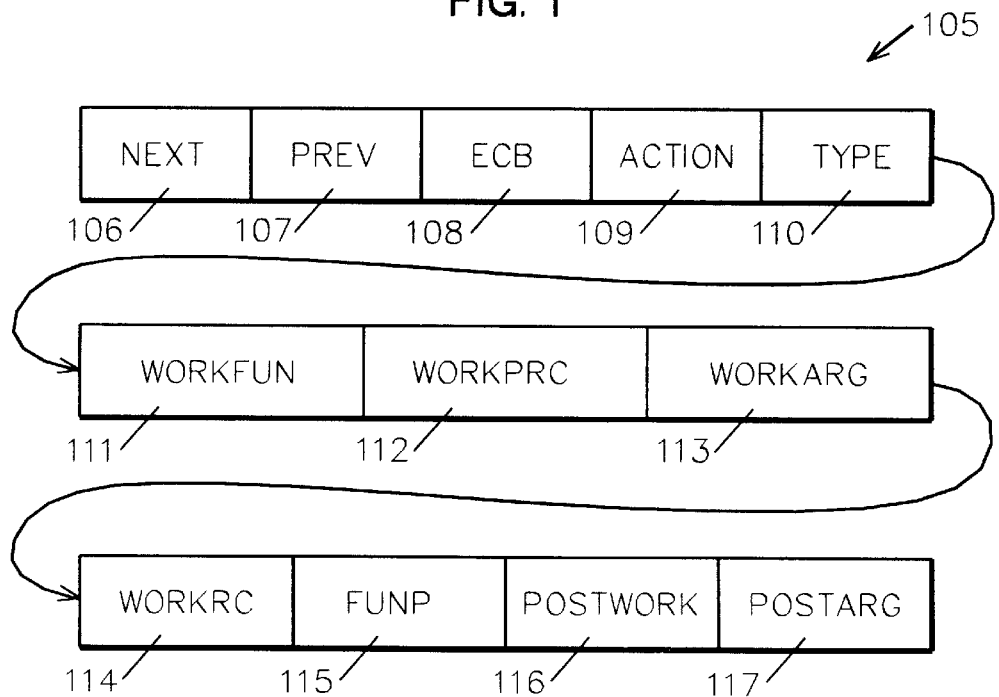
FIG. 3 illustrates the data structure of a WAIT_ELEMENT for defining waiting work in accordance with the preferred embodiment of the invention.

Referring to FIG. 3, waiting work is defined by a WAIT_ELEMENT data structure 105 including next 106, prev 107, ecb 108, action 109, type 110, workfun 111, workprc 112, workarg 113, workrc 114, funp 115, postwork 116 and postarg 117 fields. Next 106 and prev 107 are forward and backward pointers for WAIT_ELEMENTs 105 when stored in lists or queues. Ecb 108 is, in MVS, a word that is set to WAIT when a task is being made to wait. Action 109 has one of the following values: OBTAINLOCK (1), indicating that the task wants to get a lock and will wait if the lock is held by another task; RELEASELOCK (2), indicating that the task wants to release a lock; DOWNGRADE (3), indicating that the task wants to downgrade the lock; UPGRADE (4), indicating that the task wants to update the lock and will wait if necessary; WORKUNIT (5) indicating WAIT_ELEMENT 105 is not for a task but rather is queued work for the resource. Type 110 specifies the type of lock to obtain or release, with EXCLUSIVE (x80000000) indicating write mode and READ (1) indicating read mode. Workfun 111 specifies the function number, which is an index into an array of functions, to run while holding a lock to update a resource. Workprc 112 is the function argument number 1 for the resource update routine. Workarg 113 is the function argument number 2 for the resource update routine. Workrc 114 is the return value of the resource update routine. Funp 115 is a pointer to function array 130, which is the structure allocated by lock_alloctate_function_array. Postwork 116 is the post processing function number. Postarg 117 is the post processing argument.

Figure 4:
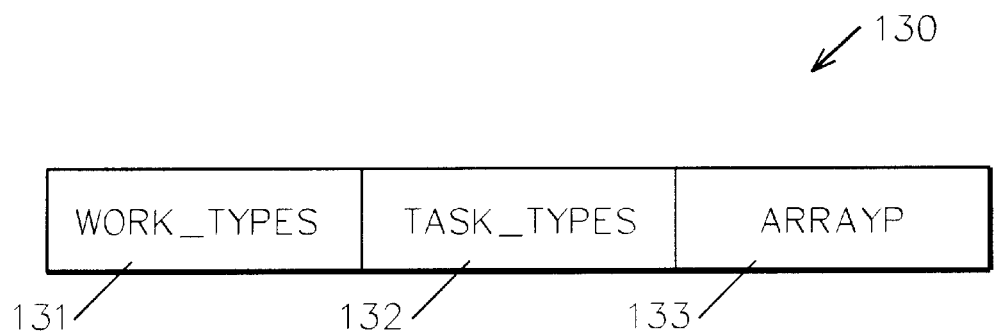
FIG. 4 illustrates the format of a function array which includes fields for defining work types and task types, and a pointer to a two dimensional array of function addresses.

Referring to FIG. 4, function array 130 includes work_types 131, task_types 132, and arrayp 133. Work_types 131 specifies the total number of rows of update functions in the array; task_types 132 specifies the total number of task types columns in the function array; and arrayp provides the pointer to or address of a two dimensional array of function addresses.

The preferred embodiment of the invention uses IBM System/390 compare and swap (CS) and compare double and swap (CDS) hardware instructions. These instructions update 4 or 8 bytes respectively in multi-processor (MP) safe fashion for MP systems. Implementations on other hardware platforms would use equivalent instructions. These instructions take an old value, a new value and an address of a word or double word in storage; the old value is compared to the word (or double word) in storage and if they are equal, the new value is stored there, otherwise the instruction fails. There are still other alternatives to the implementation. The common feature of all such implementations is the ability to queue WAIT_ELEMENTs 105 requiring update functions to be called, thus facilitating execution of update and post processing routines.

Figure 5A:
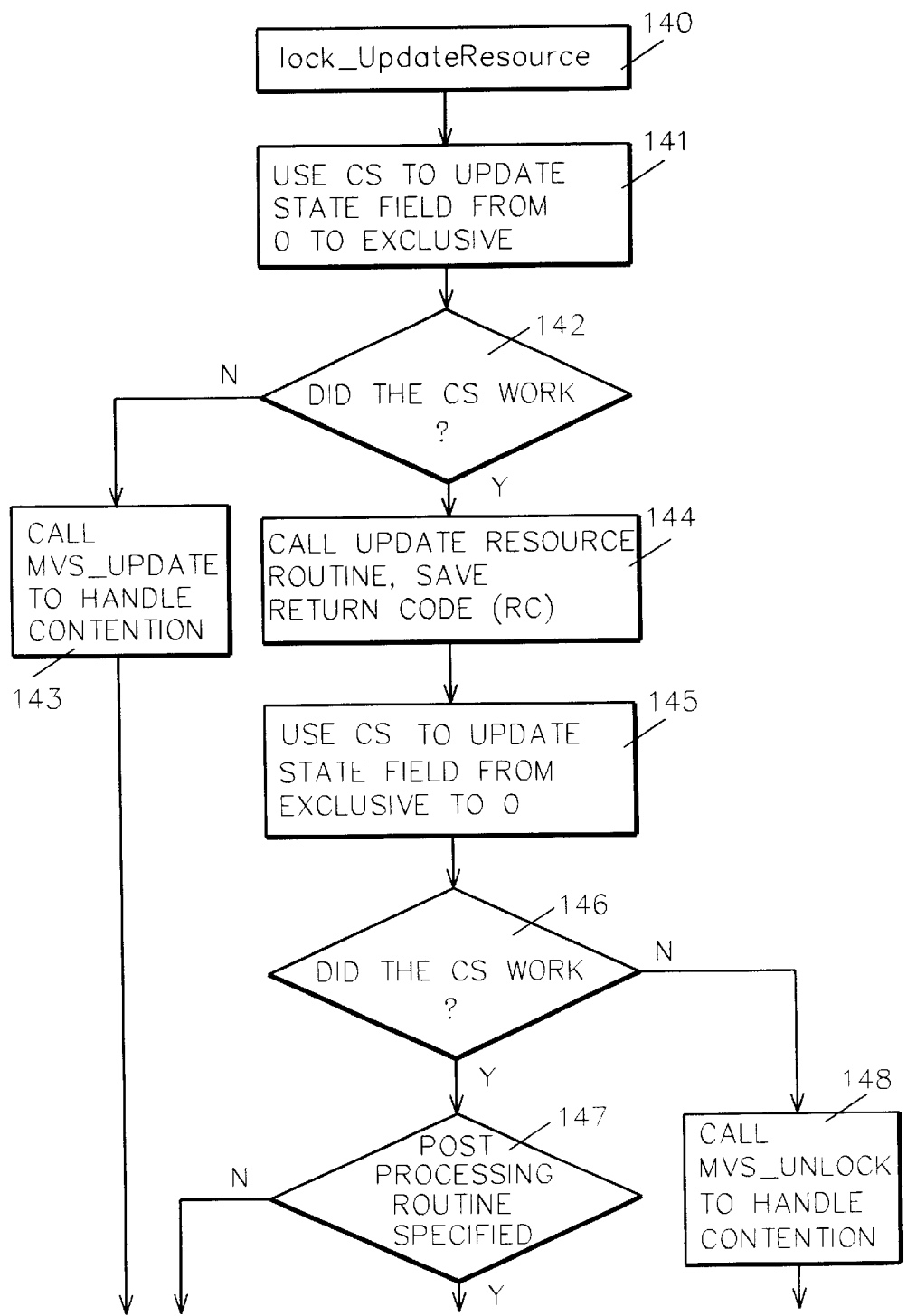
FIG. 5 is a flow diagram of the lock_UpdateResource procedure of the preferred embodiment of the invention.
Figure 5B:
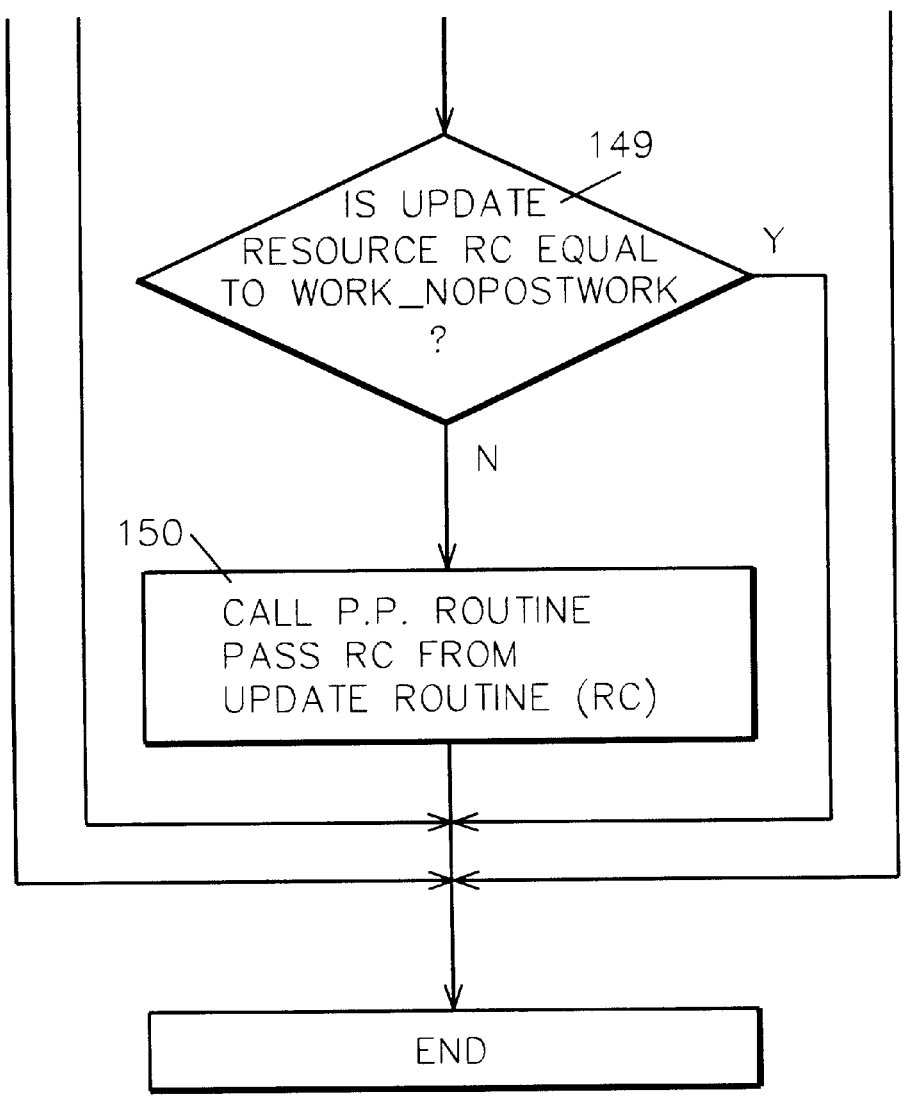
Figure 5:
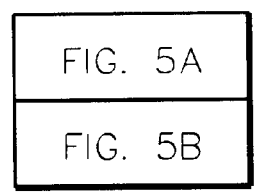

Referring to FIG. 5, the lock_UpdateResource procedure 140 is set forth. In step 141, the CS instruction is called to update state field 101 from null to exclusive. In step 142 it is determined if the CS instruction was successful. If not, in step 143 MVS_update 160 is called to handle the contention. Otherwise, in step 144 the routine for updating the resource is called, and the return code (rc) from the update resource routine is saved. In step 145 the CS instruction is used to update state field 101 from exclusive to null. In step 146 it is determined if the CS instruction in step 145 was successful, and if not in step 148 MVS_unlock 190 is called to handle the contention. Otherwise, in step 147 it is determined if a post processing routine is specified. If so, in step 149 it is determined if the update resource return code saved from step 144 is equal to WORK_NOPOSTWORK, and if not, in step 150 the post processing routine is called.

Implementation of the fastpath macros lock_Resource and unlock Resource previously defined is similar to the implementation of in line macro lock_UpdateResource 140.

Figure 6A:
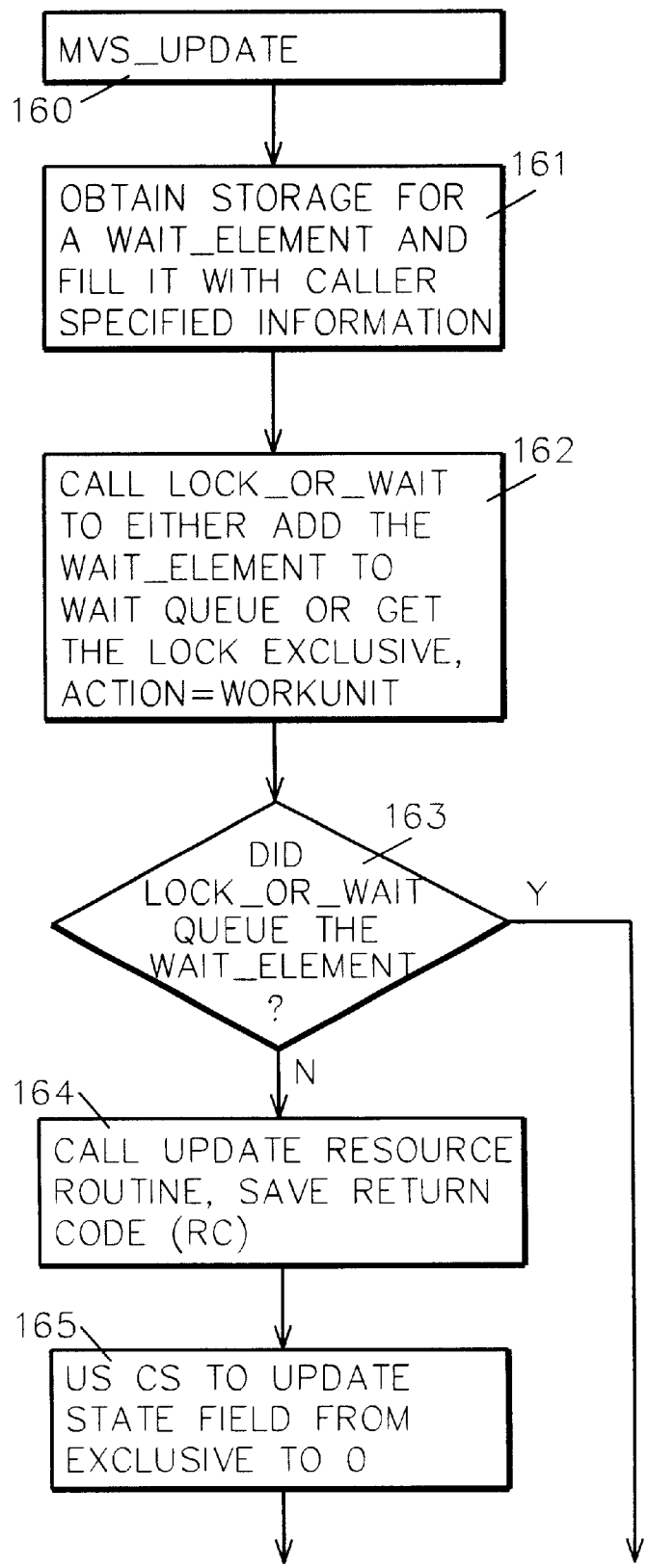
FIG. 6 is a flow diagram of the MVS_update macro procedure for handling the case where a required lock is already held in some other state and not available to the calling task.
Figures 6, 6A, 6B:
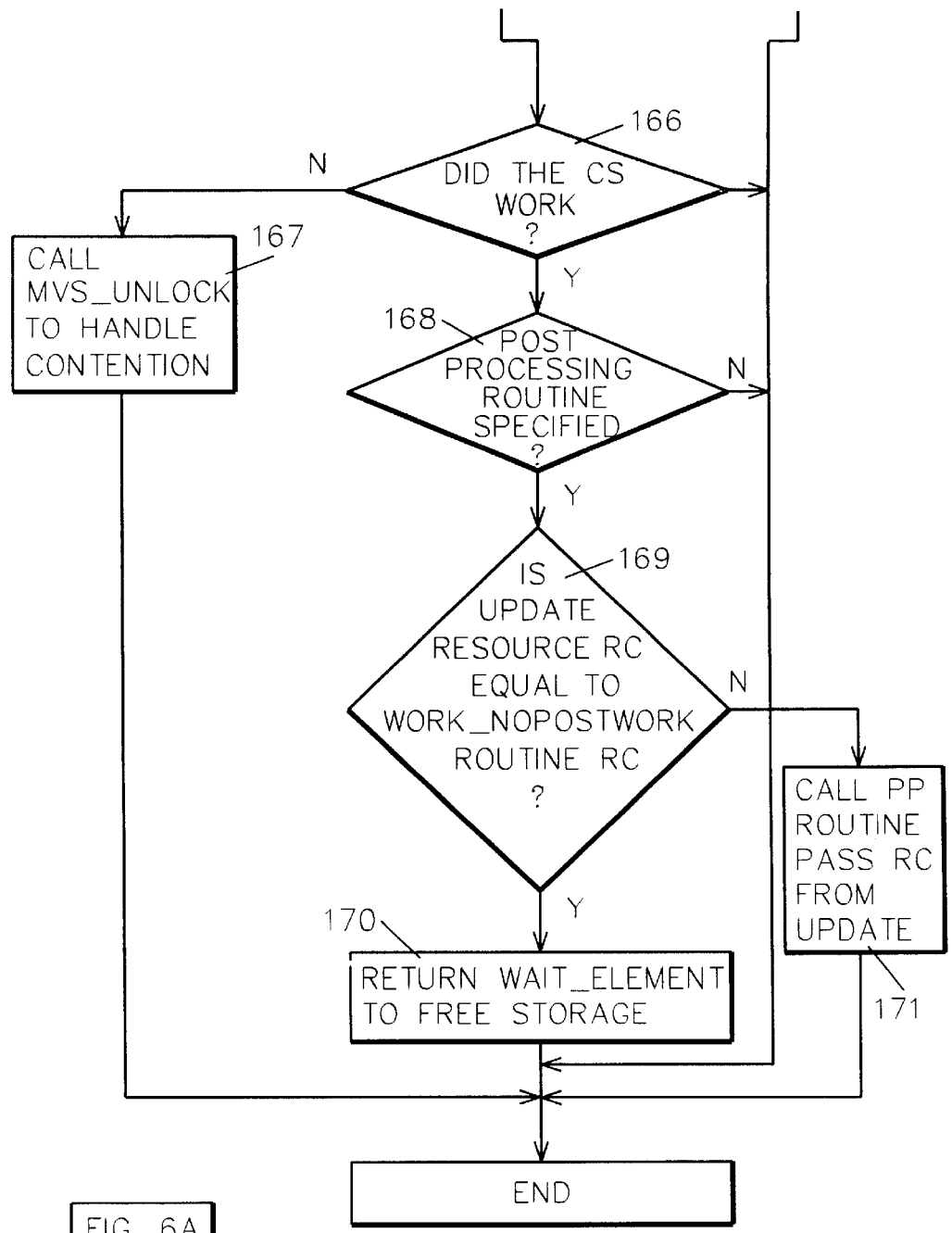

Referring to FIG. 6, MVS_update macro procedure 160 handles the case where the lock is already held in some other state and thus the calling task cannot get the lock. It takes the same parameters as the lock_UpdateResource macro. In step 161 storage is obtained for a WAIT_ELEMENT, which is then filed with caller specified information, such as function numbers, task type, arguments. In step 162, a call is made to lock_or_wait 175 either to add the WAIT_ELEMENT 105 to the wait queue 404 or to get the lock EXCLUSIVE. Action field 109 is set to WORKUNIT. In step 163 it is determined if lock_or_wait routine 175 queued the WAIT_ELEMENT 105. If not, in step 164 the update resource routine is called, and the return code (rc) saved. In step 165, the CS instruction is used to update state field 101 from exclusive to null (0). Step 166 determines if the CS instruction was successful, and if not, in step 167 MVS_unlock 190 is called to handle the contention. Otherwise, step 168 determines if a post processing routine is specified and, if so, step 169 determines if the update resource return code (rc) from step 164 is set to WORK_NOPOSTWORK. If not, step 171 calls the post processing routine and passes the return code (rc) from update step 164. If the return code is determined in step 169 to be WORK_NOPOSTWORK, in step 170 the WAIT_ELEMENT is returned to free storage.

Figure 7A:
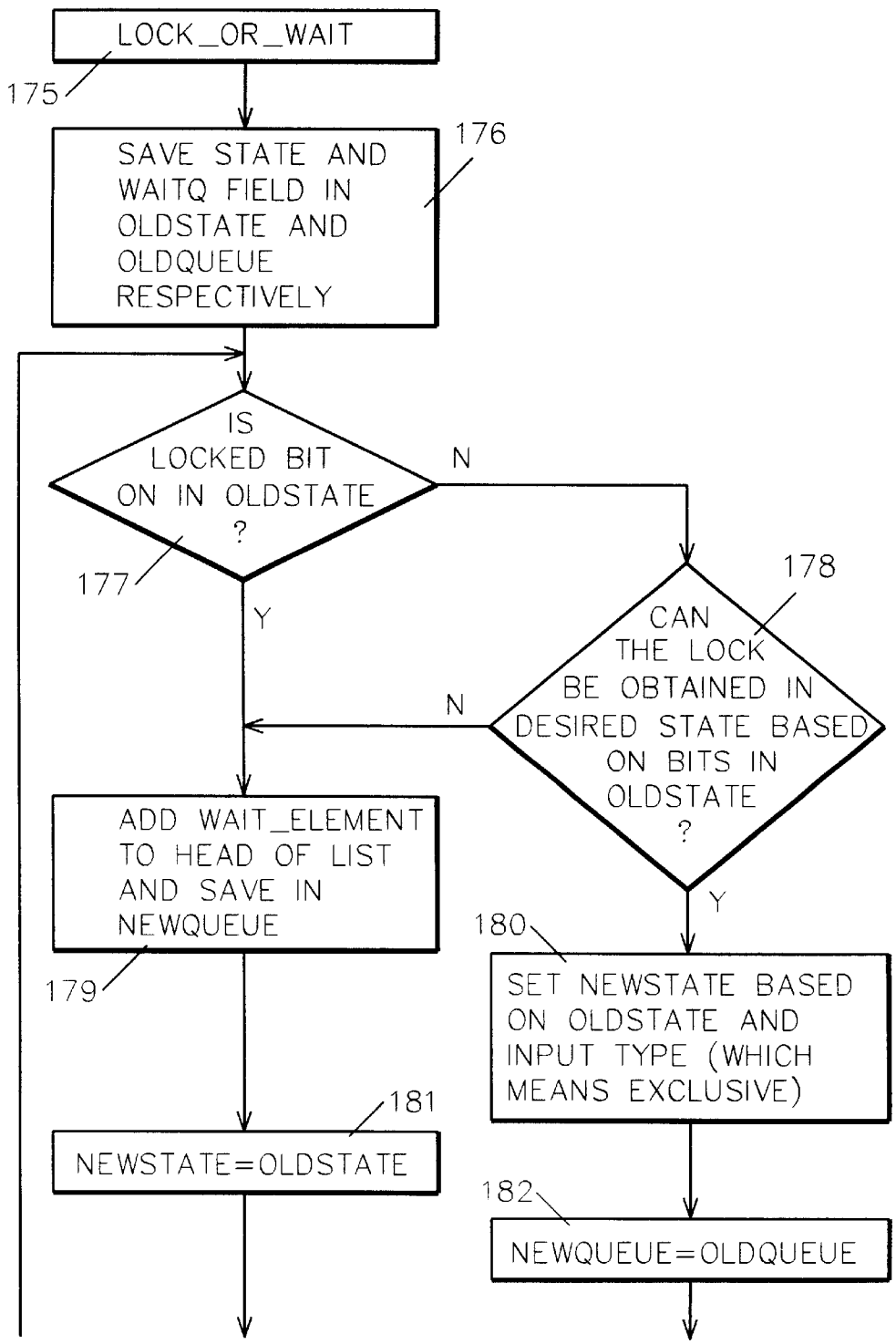
FIG. 7 is a flow diagram of the lock_or_wait routine for either getting a lock in the desired state OR, if not available, adding a wait element to LIFO wait queue.
Figures 7, 7A, 7B:
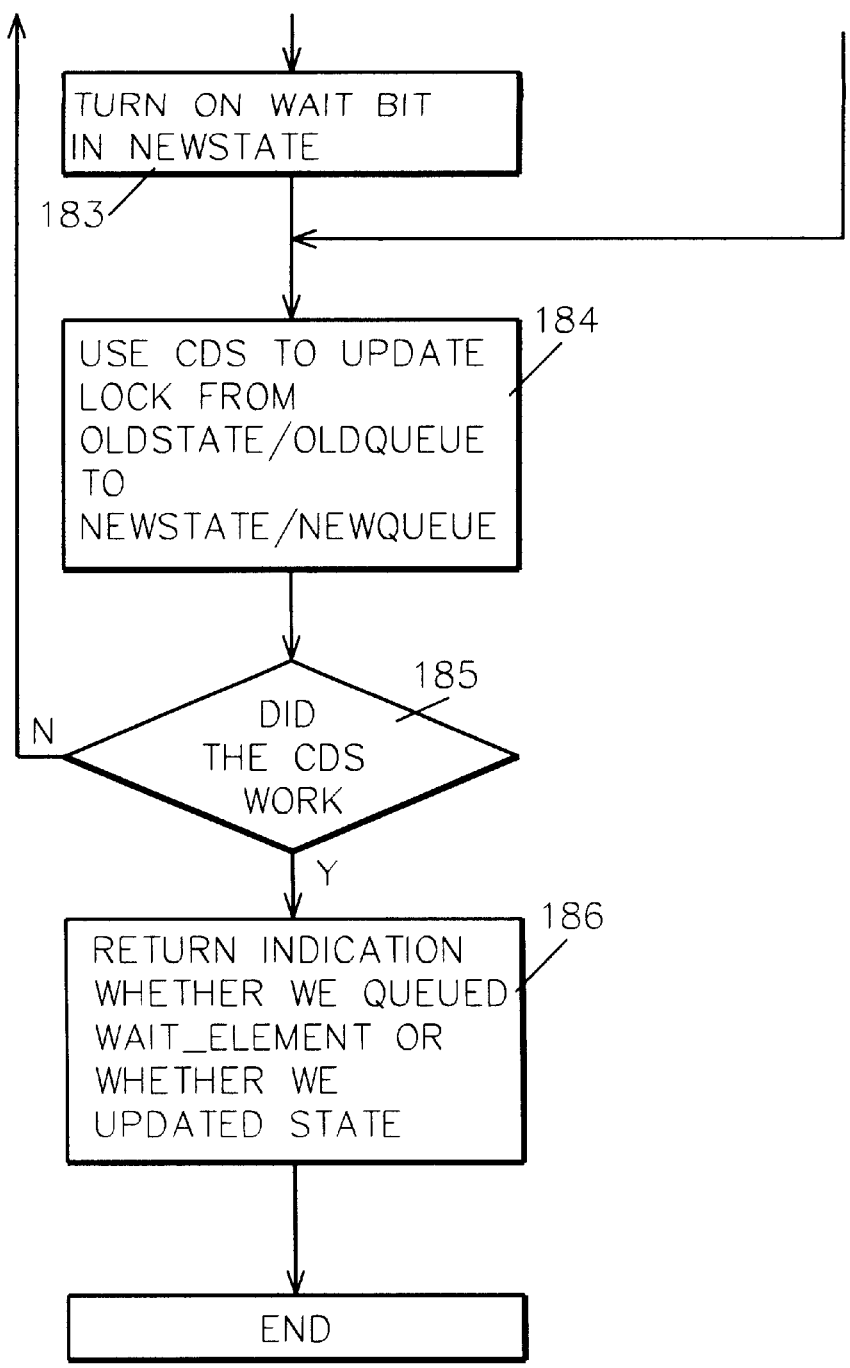

Referring to FIG. 7, lock_or_wait routine 175 will either get the lock in the desired state, OR add the wait element 105 to wait queue 404 in LIFO fashion. Lock_or_wait 175 has the following prototype:
lock_or_wait(@_of_lock, @_wait, type, action)
where:
- @_of_lock is the address of the lock.
- @_wait is the address of WAIT_ELEMENT structure.
- type is the type of lock to obtain (EXCLUSIVE, READ or LOCKED).
- action is OBTAINLOCK, RELEASELOCK, WORKUNIT, or so forth.

Type set to LOCKED indicates a special state, higher than EXCLUSIVE, which prevents any other task from updating lock state field 101.

In step 176, state field 101 and waitq field 102 are saved in oldstate 423 and oldqueue 424, respectively. Step 177 determines if locked bit 121 is on in oldstate 423. If so, WAIT_ELEMENT 105 is added to the head of the wait queue 404 and saved in newqueue 403. In step 181, newstate 421 is set equal to oldstate 423, and in step 183 the wait bit 122 is set on in newstate 421. In step 184, the CDS command is used to update the lock in oldstate 423 to the values in newstate 421. Step 185 determines if the CDS command was successful, and if so, in step 186 the return indication is set to indicate that WAIT_ELEMENT 105 was queued in wait queue 404. If not, processing returns to step 177. If, in step 177, it is determined that locked bit 121 is not set in oldstate 423, step 178 determines if the lock can be obtained in the desired state based on state bits 101 in oldstate 423. If not, processing returns to step 179; otherwise, in step 180 newstate 421 is set based on oldstate 423 and input type (which will be exclusive), and in step 182 newqueue 403 is set equal to oldqueue 424. Processing then continues to step 184 which will use the CDS command to update the lock from oldqueue 424 to newqueue 403, and in step 186 return an indication that the state of WAIT_ELEMENT 105 was updated.

In general, a loop through lock_or_wait 175 either adds in step 179 the WAIT_ELEMENT 105 to wait queue 404 OR in step 182 updates the lock state field 101 to the state desired by the caller. In step 186, it returns an indication of what it did. In general, if step 177 determines that the LOCKED bit is on in the state field, the WAIT_ELEMENT MUST be queued. If it is not on, then the caller may be able to get the lock in the desired mode and in step 178 the state is examined to see if the lock can be obtained in the desired mode. For example, if the lock is already locked read, then a task desiring to get the lock EXCLUSIVE must queue the WAIT_ELEMENT 105.

Figure 8A:
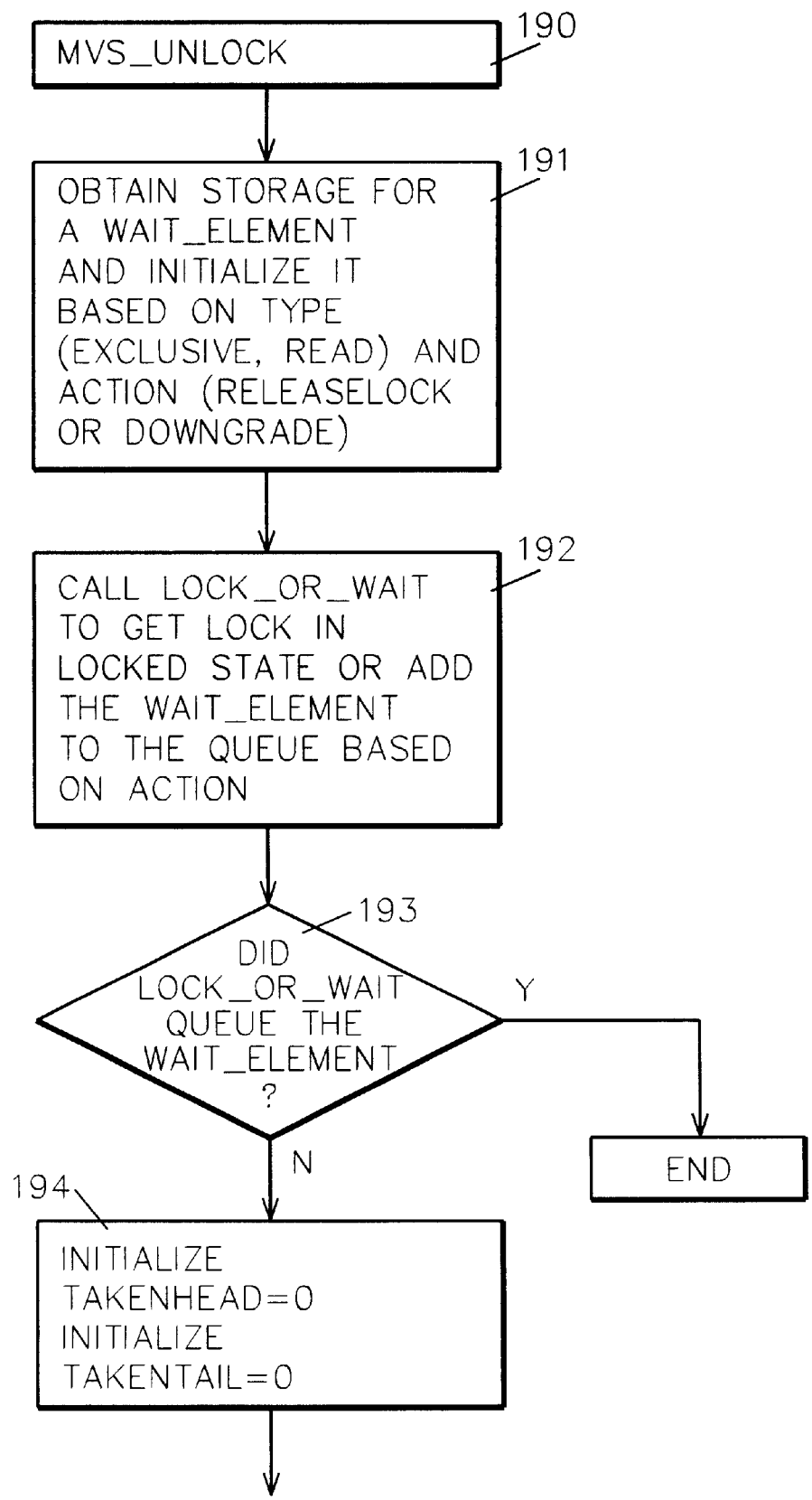
Figure 8B:
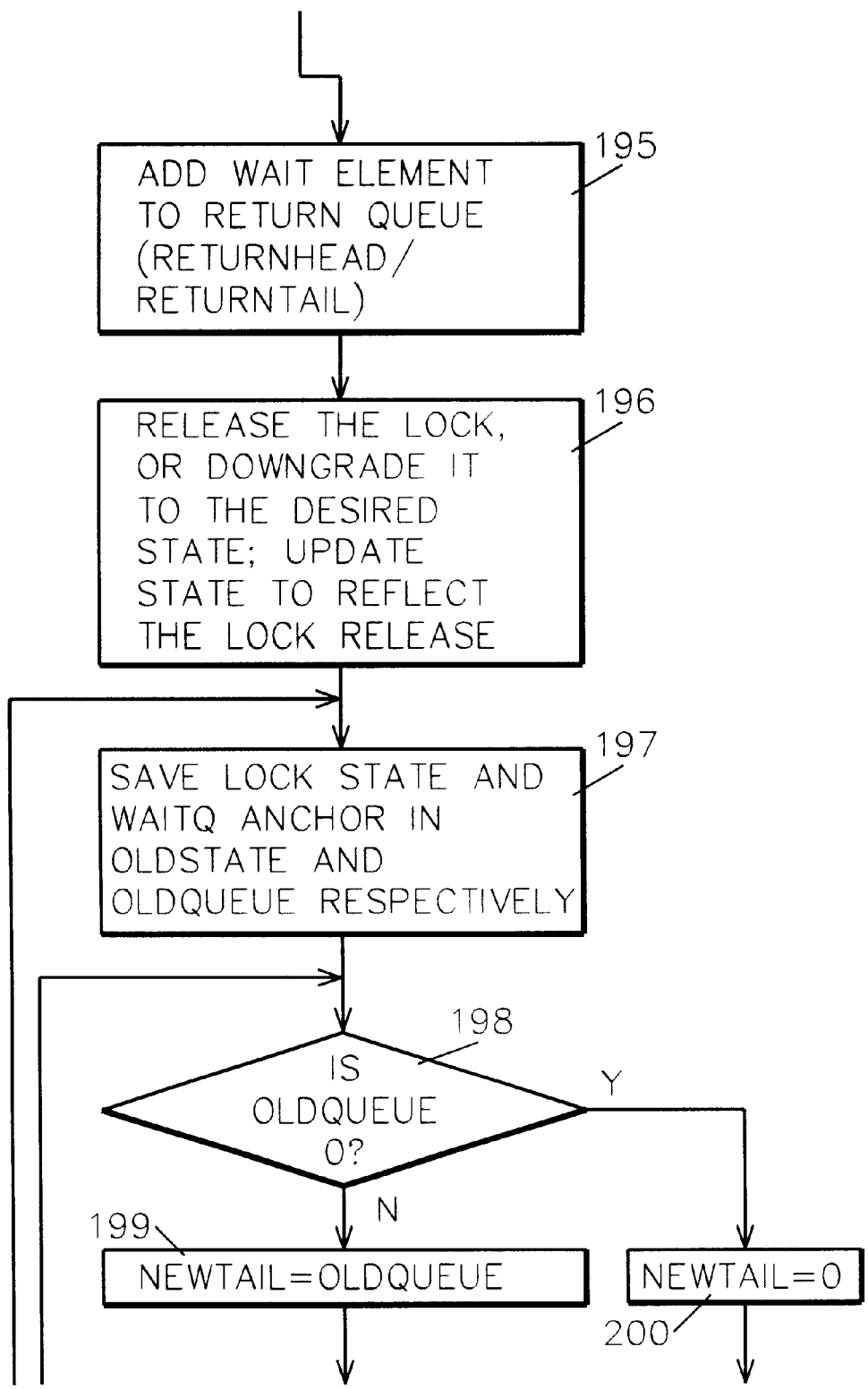
Figure 8C:
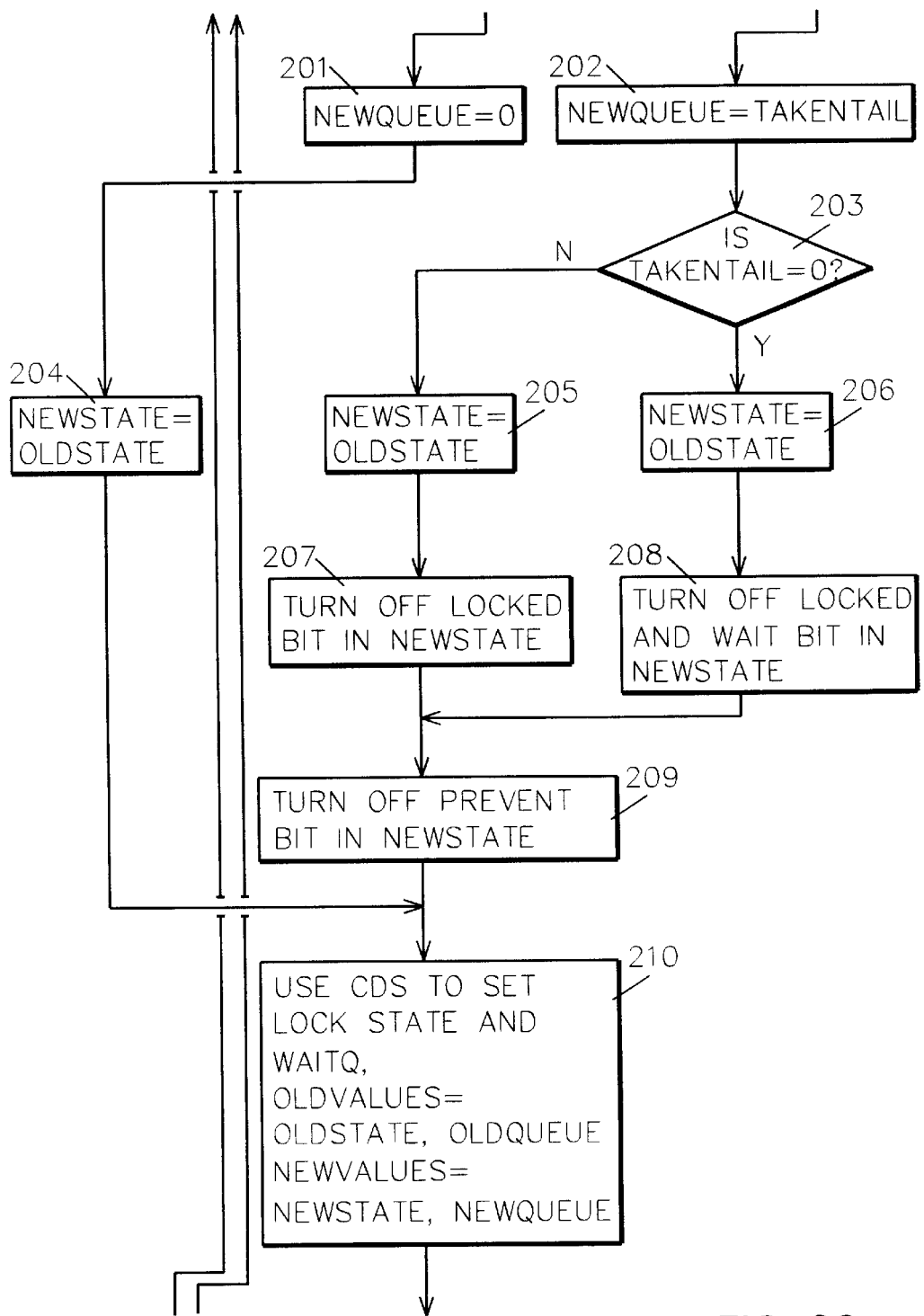
Figure 8D:
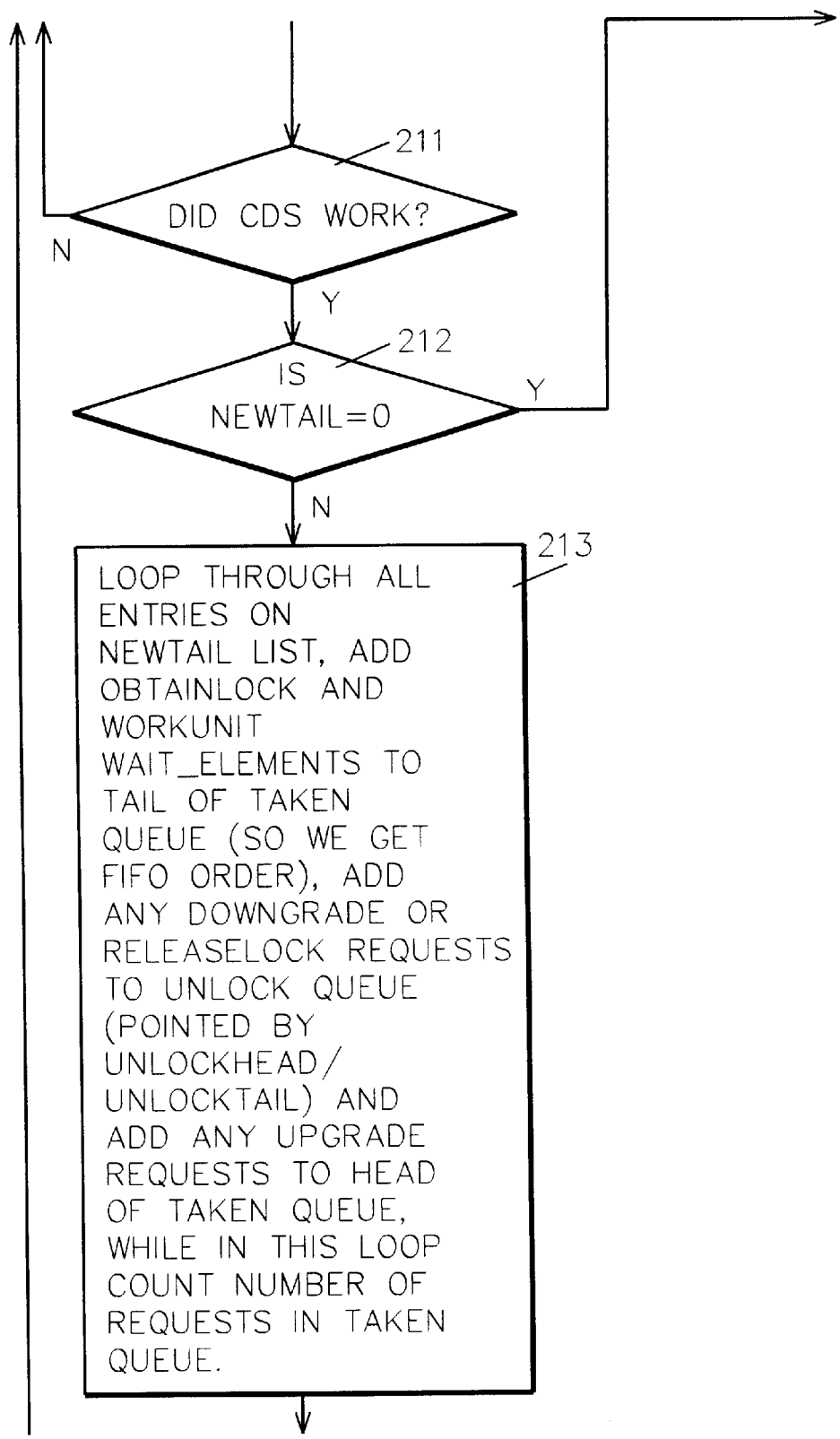
Figure 8E:
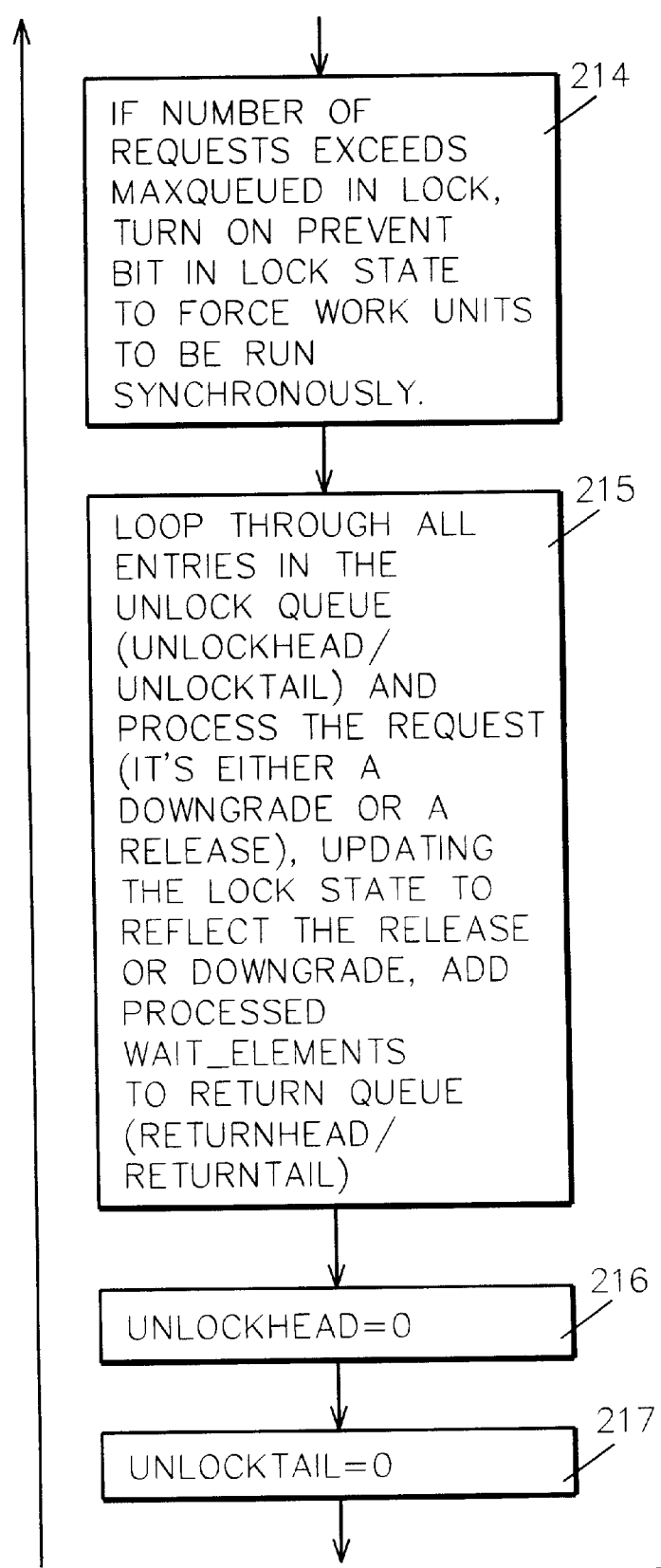
Figure 8F:
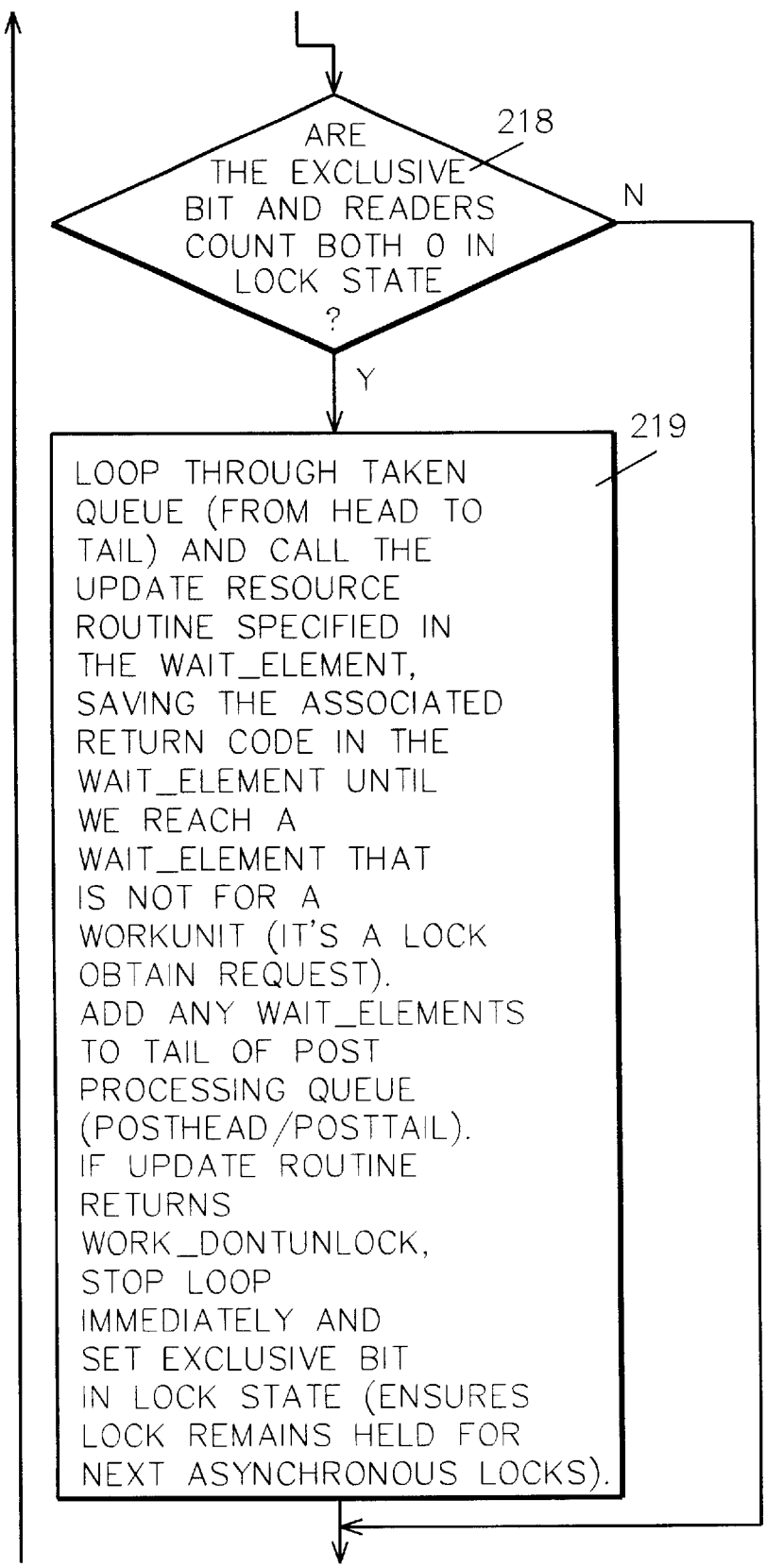
Figure 8G:
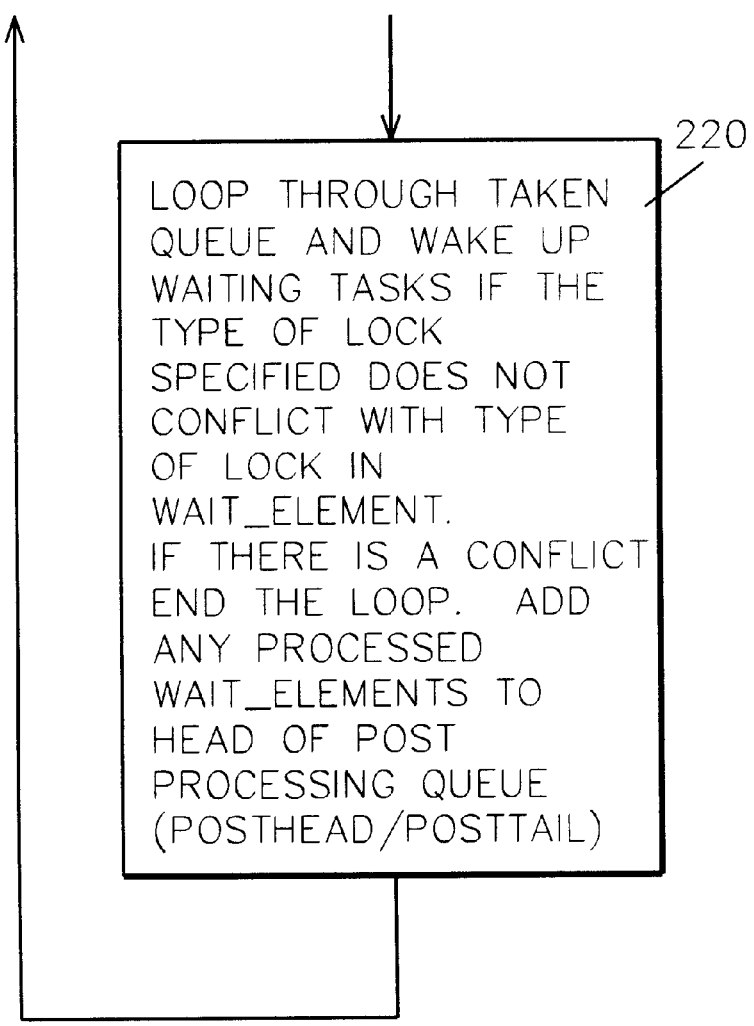
Figure 8:
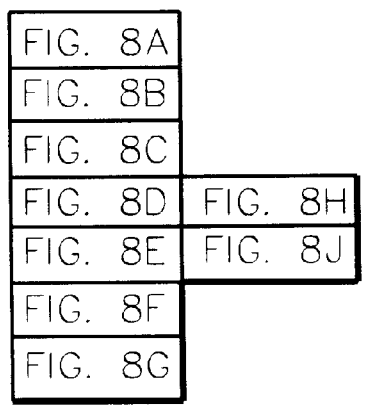
Figure 8H:
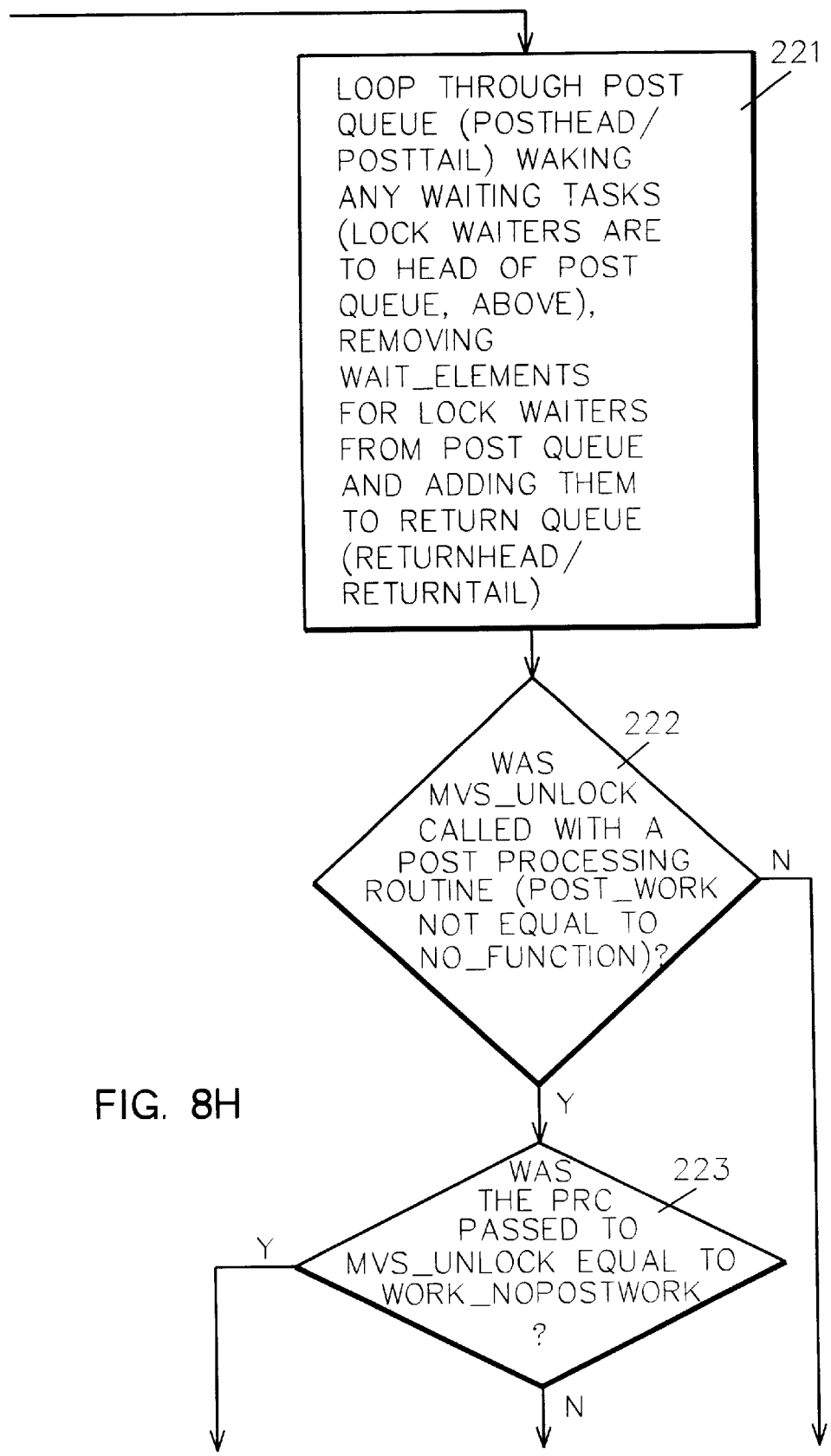
Figure 8J:
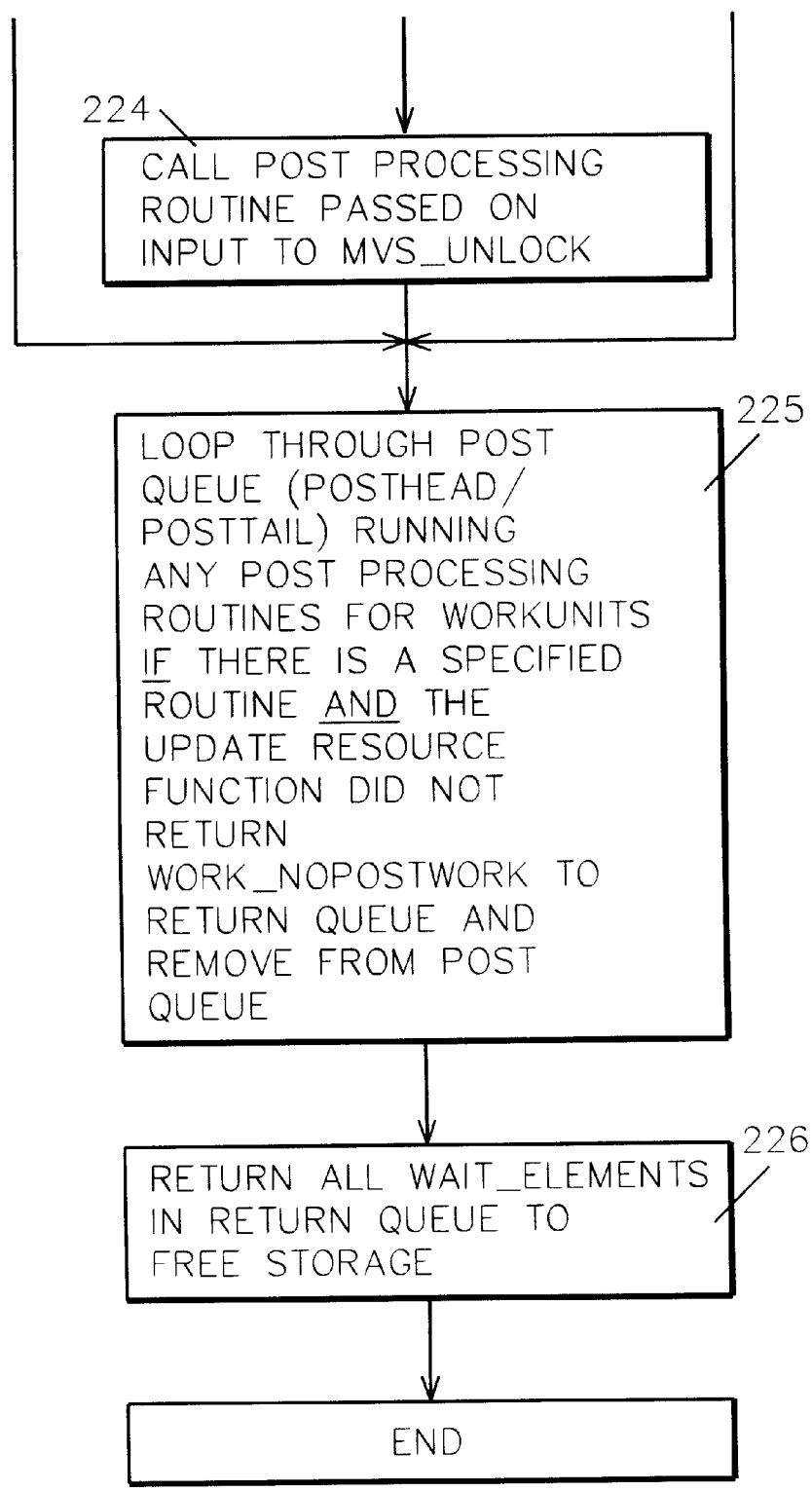

Referring to FIG. 8, MVS_unlock 190 is called any time a task tries to release a lock and it finds there are WAIT_ELEMENTs on wait queue 404 or the lock state has the LOCKED bit on. The bulk of the work is actually in the unlock routine since it has to handle de-queuing the WAIT_ELEMENTs and processing them. The MVS_unlock prototype is as follows:
MVS_unlock(@_of_lock, type, function_array, task_type, post_work, prc, post_arg)
where:
- @_of_lock is the address of lock to be released.
- type is the type of unlock to perform (either EXCLUSIVE, DOWNGRADE, or READ).
- function_array is the address of a function array containing resource functions associated with the lock.
- task_type is the type of the task making the call.
- post_work is the post processing function number.
- prc is the return code from the resource update routine.
- post_arg is the post processing function argument.

MVS_unlock 190 handles normal synchronous lock and unlock AND unlocking a lock that was held while running a resource update routine. MVS_unlock 190 loops repeatedly until it realizes is has finished processing.

Figure 36:
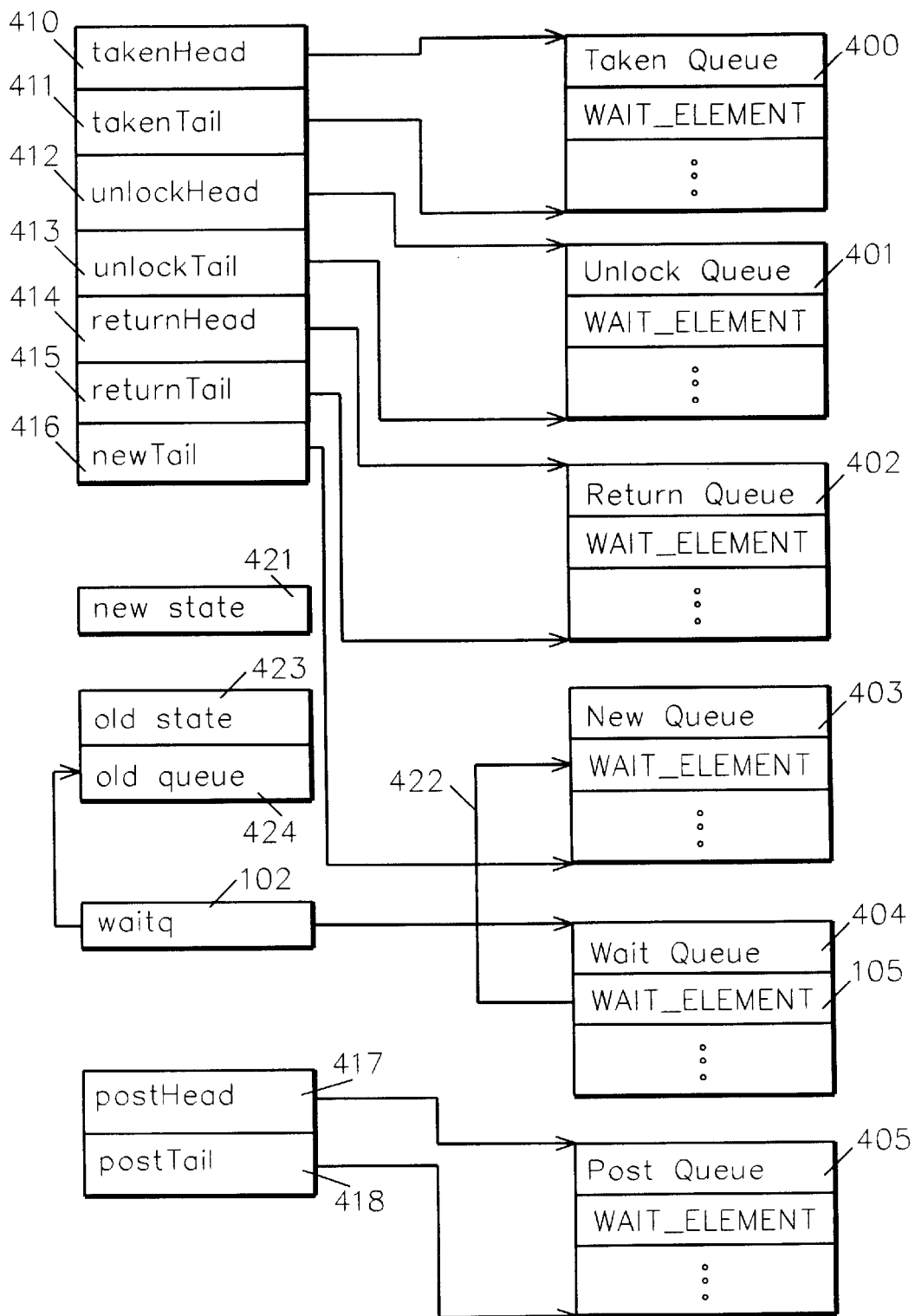
FIG. 36 is a high level system diagram of the several queues and lists between which WAIT_ELEMENTs are selectively moved in accordance with the preferred embodiments of the invention, including taken queue, unlock queue, return queue, new queue, wait queue and post queue.

Referring to FIG. 36, in accordance with the preferred embodiment of the invention, WAIT_ELEMENTs 105 are selectively moved between several queues and lists, including taken queue 400, unlock queue 401, return queue 402, new queue 403, wait queue 404 and post queue 405. These queues are anchored by takenHead 410, takenTail 411, unlockHead 412, unlockTail 413, returnHead 414, returnTail 415, newTail 416, waitq 102, postHead 417 and postTail 418, as illustrated.

Taken queue 400 contains all of the WAIT_ELEMENTs 105 MVS_unlock 190 has taken off wait queue 404 but has not processed. This queue 400 is doubly linked by takenHead 410 and takenTail 411, and thus may be traversed from head to tail (FIFO order) or tail to head (LIFO order).

NewTail 416 is a variable that has a copy of the queue anchor taken from the lock waitq field 102. NewTail 416 is the head of LIFO new queue 403.

Unlock queue 401, anchored by unlockHead 412 and unlockTail 413 is a FIFO queue of unlock or downgrade requests.

Post queue 405, anchored by postHead 417 and postTail 418, is a queue of WAIT_ELEMENTs that represent waiting tasks that need to be awakened, or that describe post processing routines that are to be run while the lock is not held.

Return queue 402, anchored by returnHead 414 and returnTail 41 5, is a list of WAIT_ELEMENTs that are fully processed and need to be returned to free storage.

Referring to FIG. 8, MVS-unlock 190 in step obtains storage for a WAIT_ELEMENT and initialize it based on type, (EXCLUSIVE, READ) and action (RELEASELOCK or DOWNGRADE).

In step 192, lock_or_wait 175 is called to get lock in LOCKED state OR add the WAIT_ELEMENT to wait queue 404 based on action.

Step 193 determines if lock_or_wait 175 queued the WAIT_ELEMENT 105. If not, in step 194 takenHead 410 takenTail 411 are initialized to zero (null); in step 195 WAIT_ELEMENT 105 is added to return queue 402, and returnHead 414 and returnTail 415 adjusted appropriately; and in step 196 the lock is released or downgraded to the desired state, and the state updated to reflect the lock release. In step 197, lock state and waitq anchor 102 are saved in oldstate 423 and oldqueue 424, respectively.

Step 198 determines if old queue 424 is null, and if not, in step 199 new tail 416 is set equal to old queue 424; in step 201 new queue 403 is set to null; and in step 204 new state 423 is set equal to old state 423; and processing continues to step 210, below. If, in step 198 it is determined that old queue 424 is not null, then in step 200 new tail 416 is set to null; and in step 202 new queue 403 is set equal to takenTail 411.

Step 203 determines if takenTail 411 is null and, if so, in step 206 new state 421 is set equal to old state 423; and in step 208 the locked and wait bits are turned off in new state 421. Processing continues to step 209, below. If step 203 determines that takenTail is not null, in step 205 new state 421 is set equal to old state 423; in step 207, the locked bit in new state 421 is turned off; and processing continues to step 209.

In step 209, the prevent bit is turned off in new state 421, and processing continues to step 210. In step 210, the CDS command is called to set lock state and waitq 102 oldvalues equal to oldstate 423 or oldqueue 424 and new values equal to newstate 421 or newqueue 403.

Step 211 determines if the CDS call was successful, and if not processing returns to step 198. If the CDS call was successful, step 212 determines if new tail 416 is null, and if not in step 213 processing loops through all entries in new queue 403, adding obtainlock and work unit WAIT_ELEMENTs to tail of taken queue 400, adding any downgrade or release lock requests to unlock queue 401, and adding any upgrade requests to the head of taken queue 400. While in this loop 213, the number of requests in taken queue 400 is counted; and in step 214 if the number of requests exceeds maxqueued 103 in lock 100, prevent bit 124 is state 101 is turned on to force work units to be run synchronously. Step 215 loops through all entries in unlock queue 401, processing the requests (which will either be to downgrade or release), and updating the lock state 101 to reflect the release or downgrade; and processed entries (WAIT_ELEMENTS) are moved to return queue 402. In step 216, unlockHead is set to null, and in step 217 unlockTail is set to null. Step 218 determines if exclusive bit 121 and readers count 125 are both null in lock state 101; if not, processing continues to step 220, below; if so, step 219 loops through taken queue 400 to call update resource routines specified in its queued WAIT_ELEMENTs, saving the associated return codes in the WAIT_ELEMENTs until a WAIT_ELEMENT is reached that is not for a work unit (but is, rather, a lock obtain request); any remaining WAIT_ELEMENTs are added to the tail of post processing queue 405; if the update routine returns WORK_DONTUNLOCK, this loop is terminated and exclusive bit 121 set in lock state 101 to ensure the lock remains held for the next asynchronous lock request.

Step 220 loops through taken queue 400, waking up any waiting tasks if the type of lock specified does not conflict with the type of lock in the queued WAIT_ELEMENT; if there is a conflict, the loop is ended. Any processed WAIT_ELEMENTs are added to the head of post queue 405 and processing returns to step 197.

If step 212 determines that newTail 416 is not null, step 221 loops through post queue 405, waking any waiting tasks, removing WAIT_ELEMENTs for lock waiters from post queue 405 and adding them to return queue 402. Step 222 determines if MVS_unlock 190 was called with a post processing routine (post_work not equal to NO_FUNCTION); if not, processing continues to step 225 below; if so, step 223 determines if the prc passed to MVS_unlock was equal to WORK_NOPOSTWORK; if so, processing proceeds to step 225; and if not, in step 224 the post processing routine passed on input to MVS_unlock is called.

Step 225 loops through post queue 405, running any post processing routines for work units if there is a specified routine and the update resource function did not return WORK_NOPOSTWORK, and moving processed work units (WAIT_ELEMENTs) from post queue 405 to return queue 402. Step 226 returns all WAIT_ELEMENTS in return queue 402 to free storage.

EXAMPLES

The asynchronous update facility of the preferred embodiment of the invention is applicable to many types of resources and applications. It is particularly well suited for those cases where a resource needs to be updated but the running task does not need to wait for the results of the update. In the preferred embodiment, a task is given the ability to use the asynchronous update function OR a standard synchronous lock obtain for the same resource. This greatly expands the possibilities.

The terms task or thread are used to denote a unit of work in a computer system. The IBM MVS Operating System WAIT function makes a task wait, and the POST function wakes up a waiting task.

Example 1

Maintaining a List of Lock Waiters

As stated above, the asynchronous facilities of the invention are merged in the preferred embodiment with a synchronous lock facility.

The design for the synchronous lock functions are not shown, but in the DFS/MVS environment, the lock facility uses low level MVS operating system facilities to make tasks wait for locks. DFS is a POSIX application. If DFS takes a program exception, the POSIX facilities are not designed to deal with tasks waiting on these low level operating system facilities (WAIT/POST). Thus the DFS lock package not only queues WAIT_ELEMENTs on the lock themselves, but in a global list that can be examined when a program exception occurs, and all waiting tasks can be awakened and told about the exception.

Figure 9:
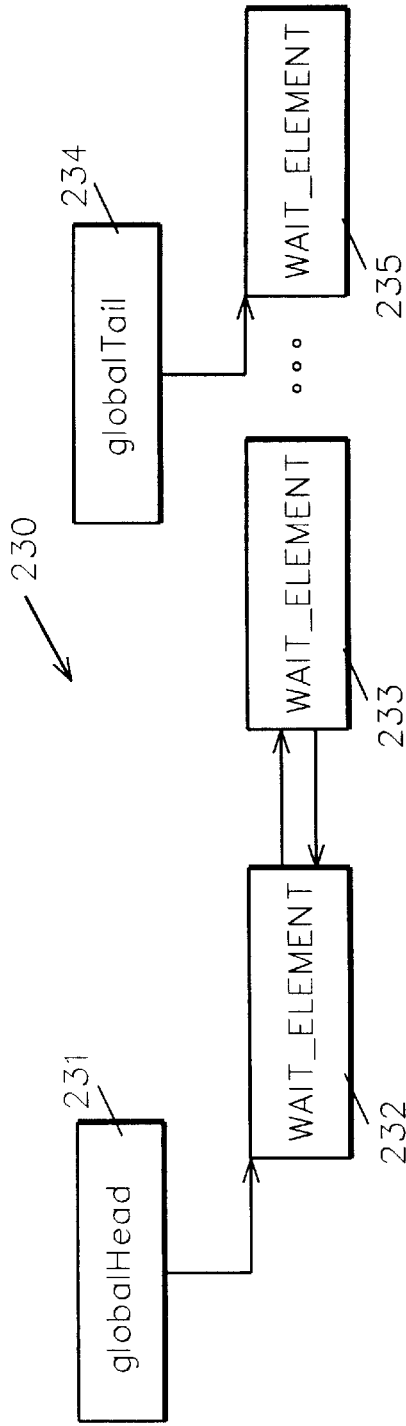
FIG. 9 illustrates a global queue for queuing task wait elements.

Referring to FIG. 9, when a task waits for a lock, it queues its WAIT_ELEMENT to the lock using lock or wait routine 175, described above, and also adds its WAIT_ELEMENT to global list or queue 230 before it waits, and removes it from global list 230 after it waits. If a standard synchronous lock is used, contention for the global list 230 would make the task wait, thus it would be possible for a task to wait two times any time it had to wait for a single lock. That is not desirable for performance.

Thus the asynchronous update facility of the preferred embodiment of the invention is used to add and remove from global list 230. The asynchronous update functions required to do are add_to_global, which a WAIT_ELEMENT 232, 233, 235 to global list 230; remove_from_global, which removes a WAIT_ELEMENT from global list 230; return_wait, which returns a WAIT_ELEMENT to free storage; and quiesce_global, which removes all WAIT_ELEMENTs from global list 230 and wakes up waiters and sets a PREVENT flag so that no more threads are allowed to wait. Global list 230 is a doubly linked list, anchored off globalHead 231 and globalTail 234.

Figure 10:
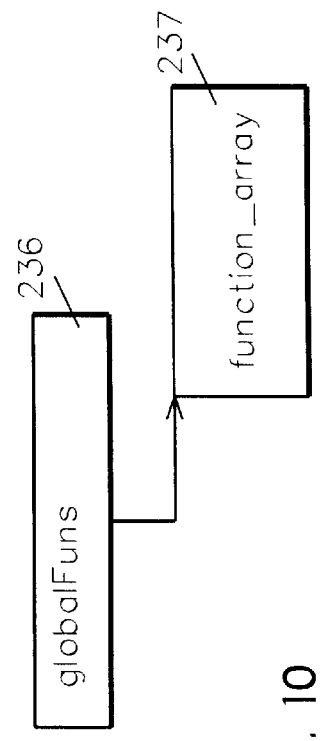
FIG. 10 illustrates an array of asynchronous update functions.

Referring to FIG. 10, the single defined task type globalFuns 236 creates a 4×1 array 237 of asynchronous update functions.

Figure 11:
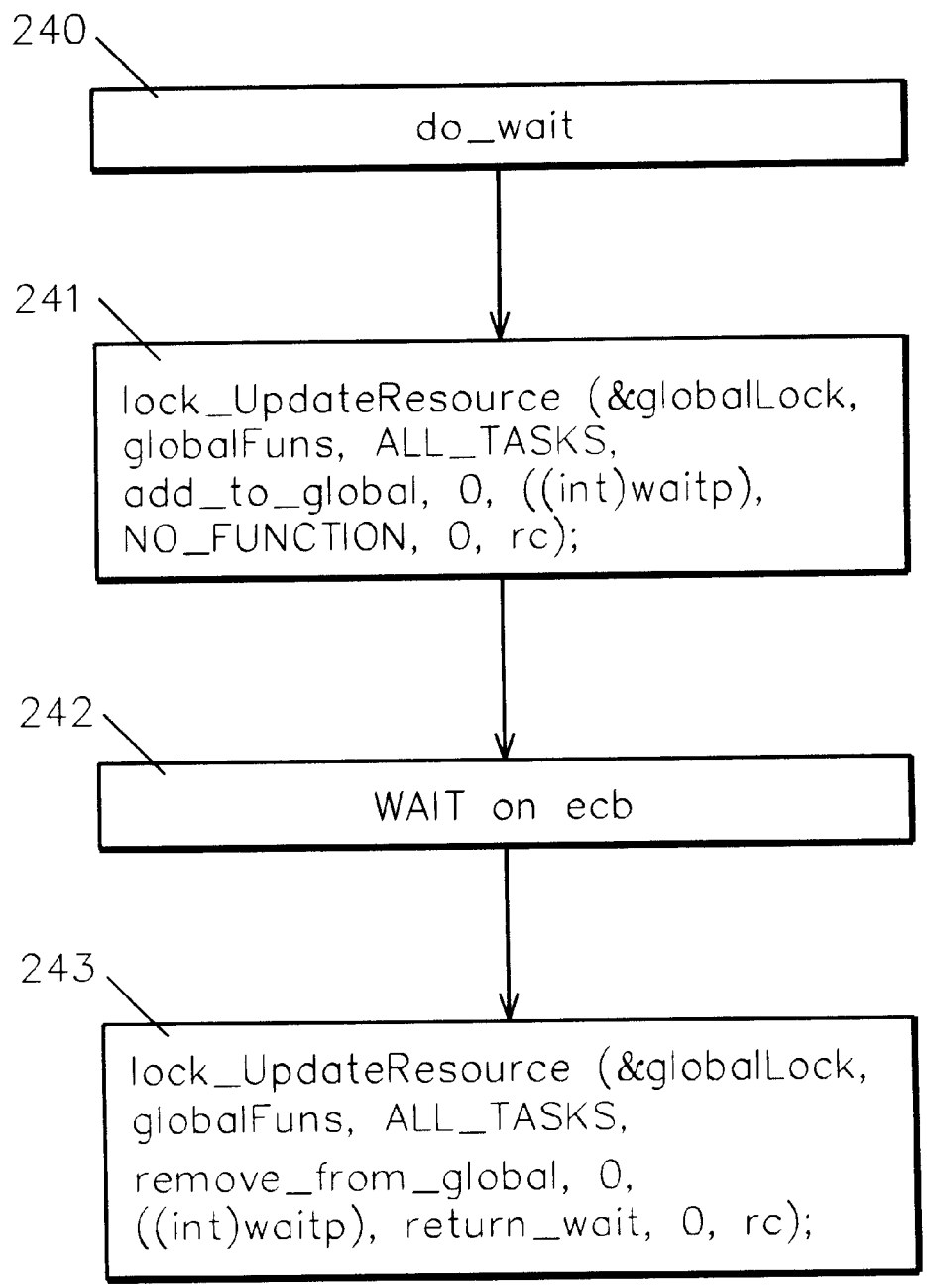
FIG. 11 is a flow diagram of the do_wait procedure executed each time a thread needs to go into a wait for a lock.

Referring to FIG. 11, do_wait 240 is executed each time a thread needs to go into a wait for a lock. Step 241 executes the procedure:

lock_UpdateResource(&globalLock, globalFuns, ALL_TASKS, add_to_global, 0, ((int)waitp), NO_FUNCTION, 0, rc);

Step 242 waits on ecb; and upon receiving it, step 243 executes the procedure:

lock_UpdateResource(&globalLock, globalFuns, ALL_TASKS, remove_from_global, 0, ((int)waitp), return_wait, 0, rc).

In this way, the task waiting on a lock 100 will only actually suspend itself on the WAIT call. Adding and removing tasks (WAIT_ELEMENTs) from global list 230 is done in a manner guaranteed not to make the calling task wait. In the first call 241 to lock_UpdateResource 140, add_to_global routine 245 is the update routine and waitp is the address of the WAIT_ELEMENT 105 which gets passed to the add_to_global routine 245. No post processing routine is needed. In the second call 243 remove_from_global 250 is the routine that removes the entry (one of WAIT_ELEMENTs 232, 233 OR 235) from global list 230, return_ wait is the post processing routine that will return the WAIT_ELEMENT to free storage.

Figure 12:
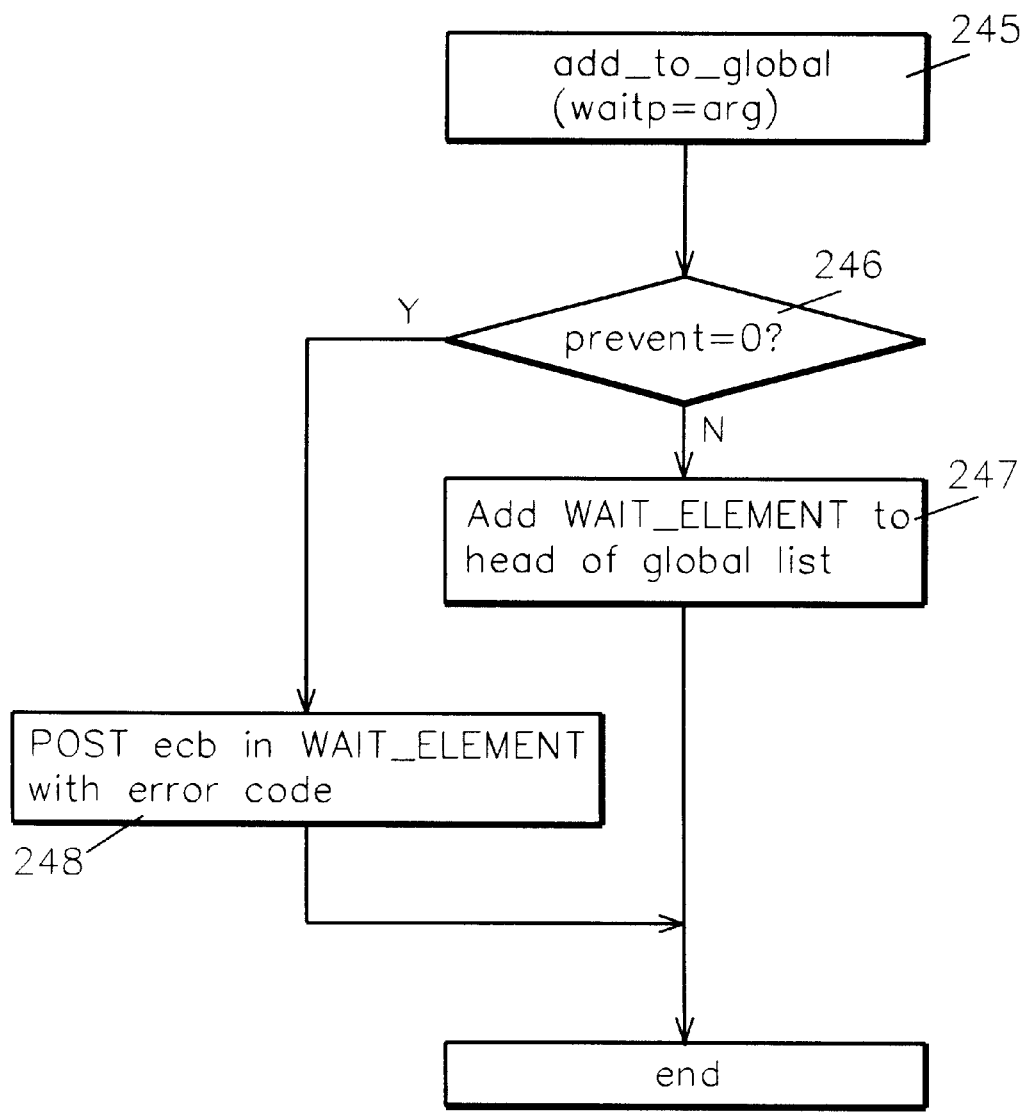
FIG. 12 is a flow diagram of the add_to_global routine for selectively adding a wait element to the global queue.

Referring to FIG. 12, add_to_global routine 245 (with waitp-arg) includes step 246 which determines if prevent flag is null; if so, step 248 posts an error code in the ecb field 108 of the WAIT_ELEMENT being processed; and, if not, step 247 adds the WAIT_ELEMENT (in this case, task 232) to the head of global list 230.

Figure 13:
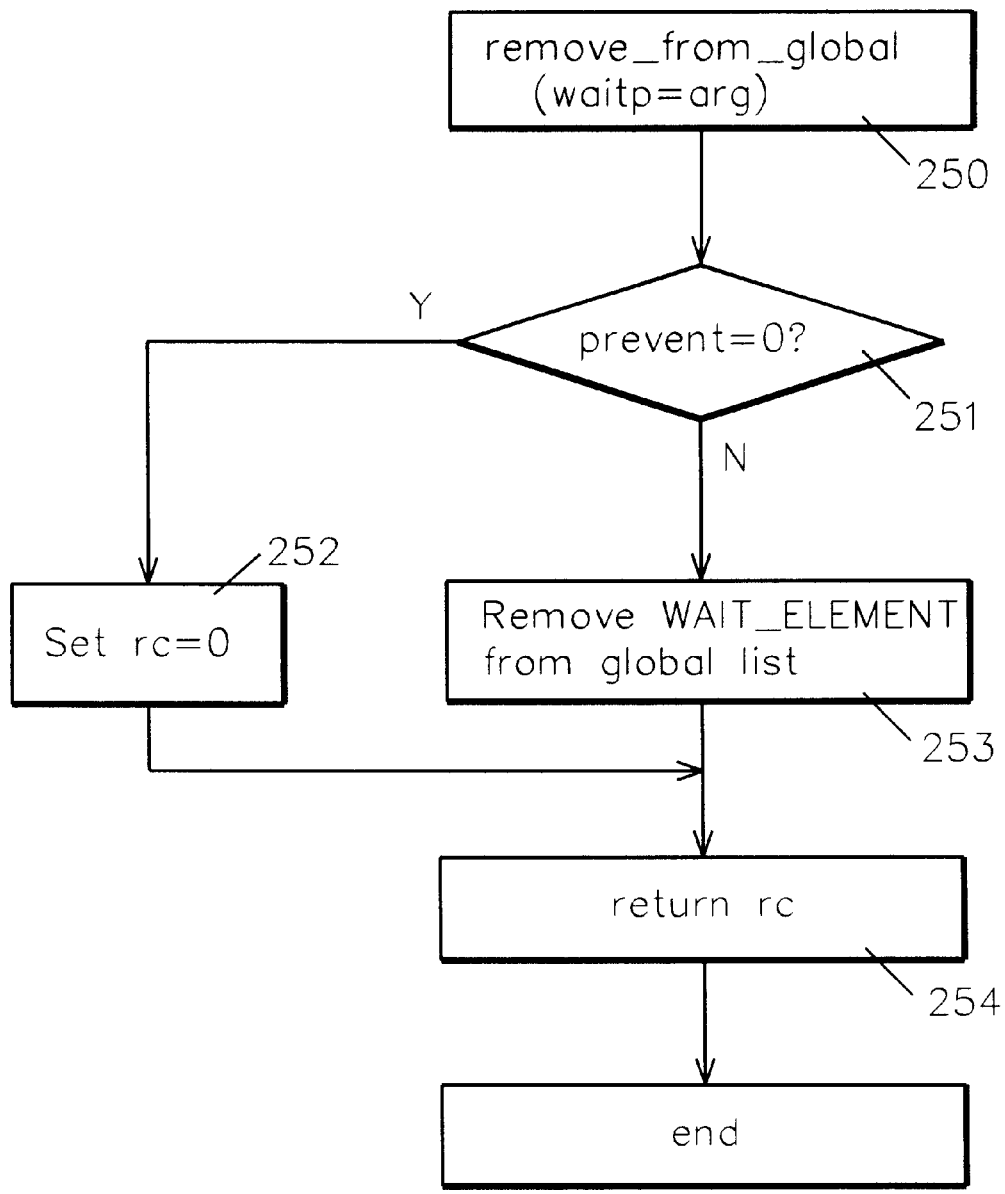
FIG. 13 is a flow diagram of the remove_from_global routine for selectively removing a wait element from the global queue.

Referring to FIG. 13, remove_from_global routine 250 (with waitp=arg) includes step 251 which determines if prevent flag 124 is null. If so, return code (rc) is set to zero; and if not, this WAIT_ELEMENT (say, 233) is removed from global list 230. In step 254, the return code (rc) is returned to the caller.

Figure 14:
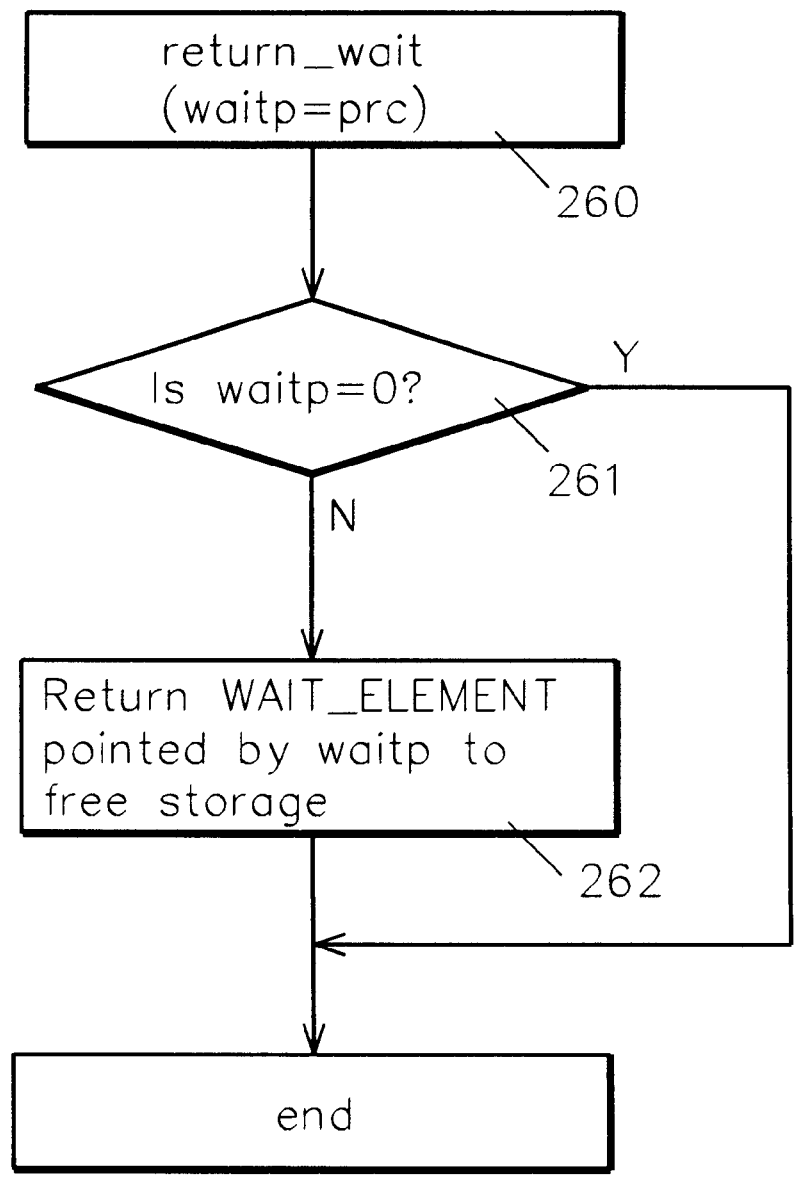
FIG. 14 is a flow diagram of the post processing return_wait routine for selectively returning a wait element to free storage.

Referring to FIG. 14, return_wait routine 260 (with waitp=prc) includes step 261 which determines if waitp is null. If not, the WAIT_ELEMENT pointed to be waitp is returned to free storage. Return wait 260 is the post processing routine for remove_from_global 250, and remove_from_global communicates the address of the WAIT_ELEMENT via its return code, that is input to return_wait (automatically by the resource update facility) as prc. Return_wait 260 returns the WAIT_ELEMENT to free storage. Since routine 260 is a post processing routine, the free storage return is NOT performed while holding the lock. This shows the benefits of a post processing routine, and passing the return value from a resource update routine to the post processing routine.

Figure 15:
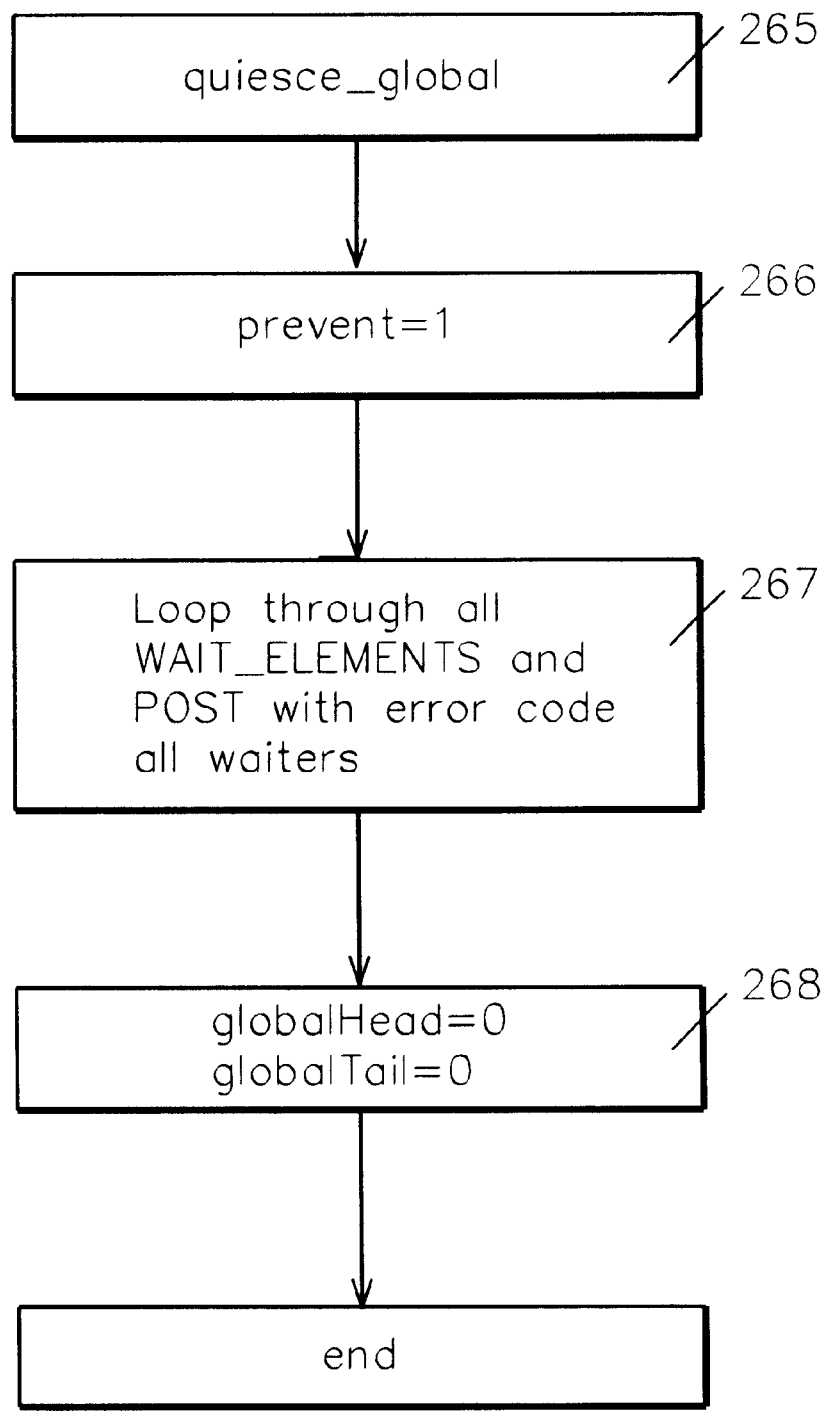
FIG. 15 is a flow diagram of the quiesce_global routine for quiescing the global queue.

Referring to FIG. 15, quiesce_global 265 wakes up all waiters and in step 267 tells them that the program is terminating due to error by way of prevent flag 124 being set to 1 in step 266. In step 268 pointer 231 and 234 are cleared so global list 230 is empty.

Example 2

Managing an I/O Device Holding Queue

This example relates to the system described in U. S. patent application Ser. No. 09/240,719 filed Oct. 29, 1999 by S. T. Marcotte for System and Method for Application Influence of I/O Service Order Post I/O Request, assignee docket EN998137. Marcotte describes an I/O queuing system that has a holding queue above the device that queues pending I/Os if the number of I/Os issued to the device is greater than Max_Issued which is a number that is adjustable by the application using the I/O driver therein described.

Figure 16:
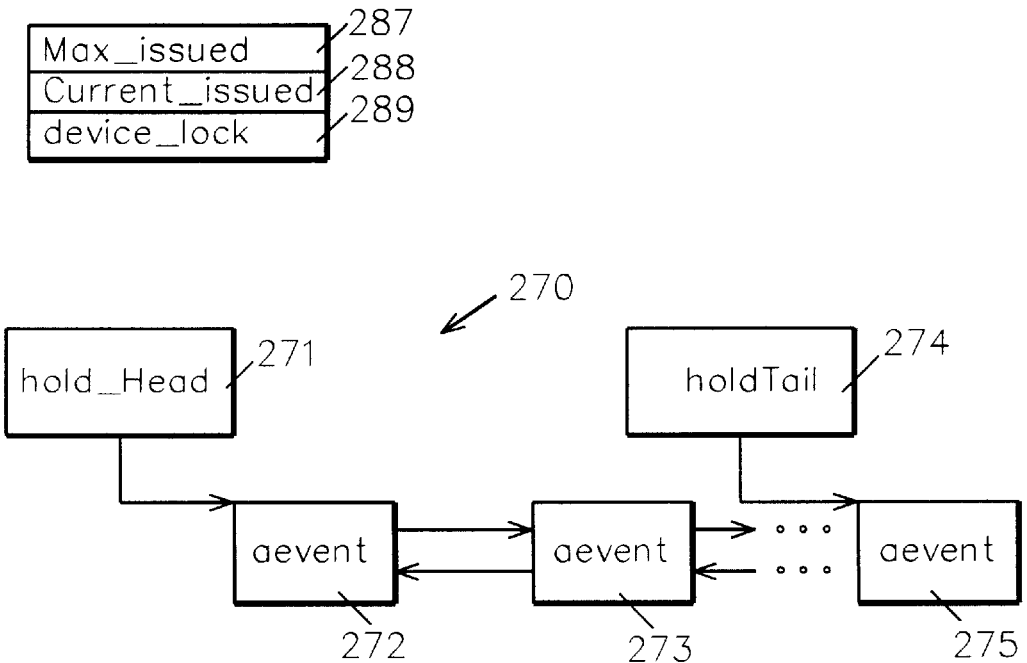
FIG. 16 is a diagram illustrating a holding queue of aevents.

Referring to FIG. 16, in this example, a holding queue 270 of aevents 272, 273, 275 is provided anchored by holdHead 271 and holdtail 274, along with max_issued count 287, current_issued count 288, and device_lock 289. Max_issued stores the maximum number of I/O operations that are to be sent to the device, and current_issued count 288 stores the number of I/O events that have actually been issued to the device. If current_issued 288 is equal to or greater than max_issued 288, then I/O operations (aevents) are added to holding queue 270 rather than sent directly to the device. When an I/O completes, the I/O driver runs code to take the first I/O (aevent 272) off holding queue 270 if current_issued 288 would fall below Max_Issued count 287.

A calling application may bypass holding queue 270 even if current_issued count 288 exceeds max_issued count 287, thus giving the application almost total control over the queuing. Additionally, the calling application can later move the I/O (aevent) from holding queue 270 to the device even if Current_Issued 288 exceeds Max_Issued 287, which allows the calling application to re-order I/O after it has been issued.

Holding queue 270, Max_Issued 287 and Current_Issued 288 may be managed by a lock using the asynchronous resource update facility of the preferred embodiment of the invention. In this system, when I/Os complete at the device, the operating system (MVS) dispatches a special task called an SRB, the I/O driver is written in C code and use C tasks, while the system SRB code to handle I/O completion is written in assembler and has a different execution environment than C. Thus in this solution, two task types (C task and SRB task) are defined, thus illustrating the advantage of having multiple defined task types 110. The I/O driver uses these asynchronous update facility tasks to manage the I/O holding queue without ever having to suspend to obtain a synchronous lock. This achieves better performance and eliminates the need to suspend the system I/O completion SRB.

An aevent data structure is used to represent a pending I/O. This aevent data structure describes all of the relevant information pertaining to the I/O operation and has an ECB to wait on if a task needs to wait for the I/O to complete before continuing its processing. Thus tasks may have to wait for I/O, but never have to wait to update the I/O queue. In this specific embodiment, Max_issued is set to 2, which provides best performance. The resource update routines provided included queue_io 280, issue_io 290, schedule_io 300 and schedule_first_io 310. These are described more fully hereafter with respect to FIGS. 18, 19, 20 and 21, respectively.

queue_io 280 is the routine called to introduce a new I/O operation to the I/O system. It will add the I/O to the holding queue IF the caller has not asked that the queue be bypassed OR Current_Issued 288 is less than Max_Issued 287.

issue_io 290 is a post processing routine that issues the I/O to the operating system device.

schedule_io 300 is called to either move an I/O from holding queue 270 to the device (regardless of the values of Current_Issued 288 or Max_Issued 287), or cancel the I/O (aevent) by removing it from holding queue 270 while not sending it to the device.

schedule_first_io 310 is the routine called when an I/O completes (which means there is one less I/O sent to the device) and takes the first one from the holding queue depending on the values of Current_Issued and Max_Issued.

Figure 17:
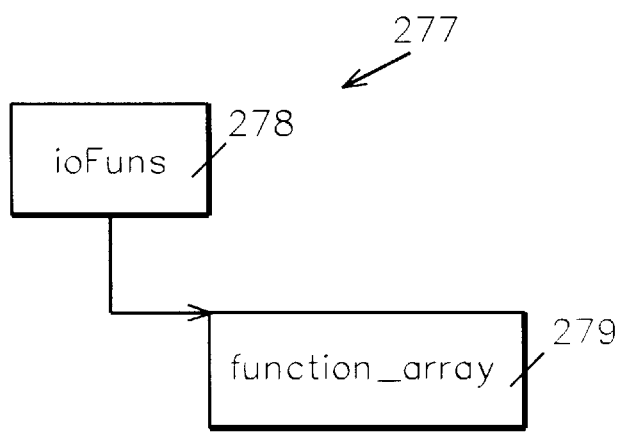
FIG. 17 is a diagram illustrating a function_array.

Referring to FIG. 17, for this example, function_array 279 is a 4×2 array of functions, the four update types (280, 290, 300, and 310) times two for each task type (C task or SRB).

In general, when an application needs to issue a new I/O, it will issue the following asynchronous resource update call:

lock_UpdateResource(&adevice→lock, ioFuns, CTASK, queue_io, 0, ae, issue_io, ae, rc);

Where ae is the address of the aevent structure representing the I/O operation, the code is running on a C task, and the post processing routine issue_io will issue the I/O to the device.

When an application wants to either cancel an I/O, or ensure that an I/O is on its way to the device, it makes the following call (this allows the application to influence the order of I/O by moving an I/O from the middle of the queue for example):

lock_UpdateResource(&devp→lock, ioFuns, CTASK, schedule_io, 0, ae, issue_io, ae, rc);

Where, again, ae is the address of the aevent structure, code is running on a C task, and the aevent is marked whether cancel is requested or not (in which case the I/O is never sent to the device).

When an I/O completes, the system schedules an SRB which will check the I/O holding queue and possibly schedule the first I/O to the device (depending on Max_Issued 287 and Current_Issued 288, as discussed above). It makes the following call:

lock_UpdateResource(&devp→lock, ioFuns, SRB, schedule_first_io, 0, ae, issue_io, ae, rc);

Referring to FIGS. 18–21, for this example embodiment, update procedures 280, 290, 300 and 310 are executed. This may be done by coding assembler and C versions, for example, of these four routines into the application program. Since this is asynchronous, either the C code version or the SRB code could be called to execute these routines.

Figure 18:
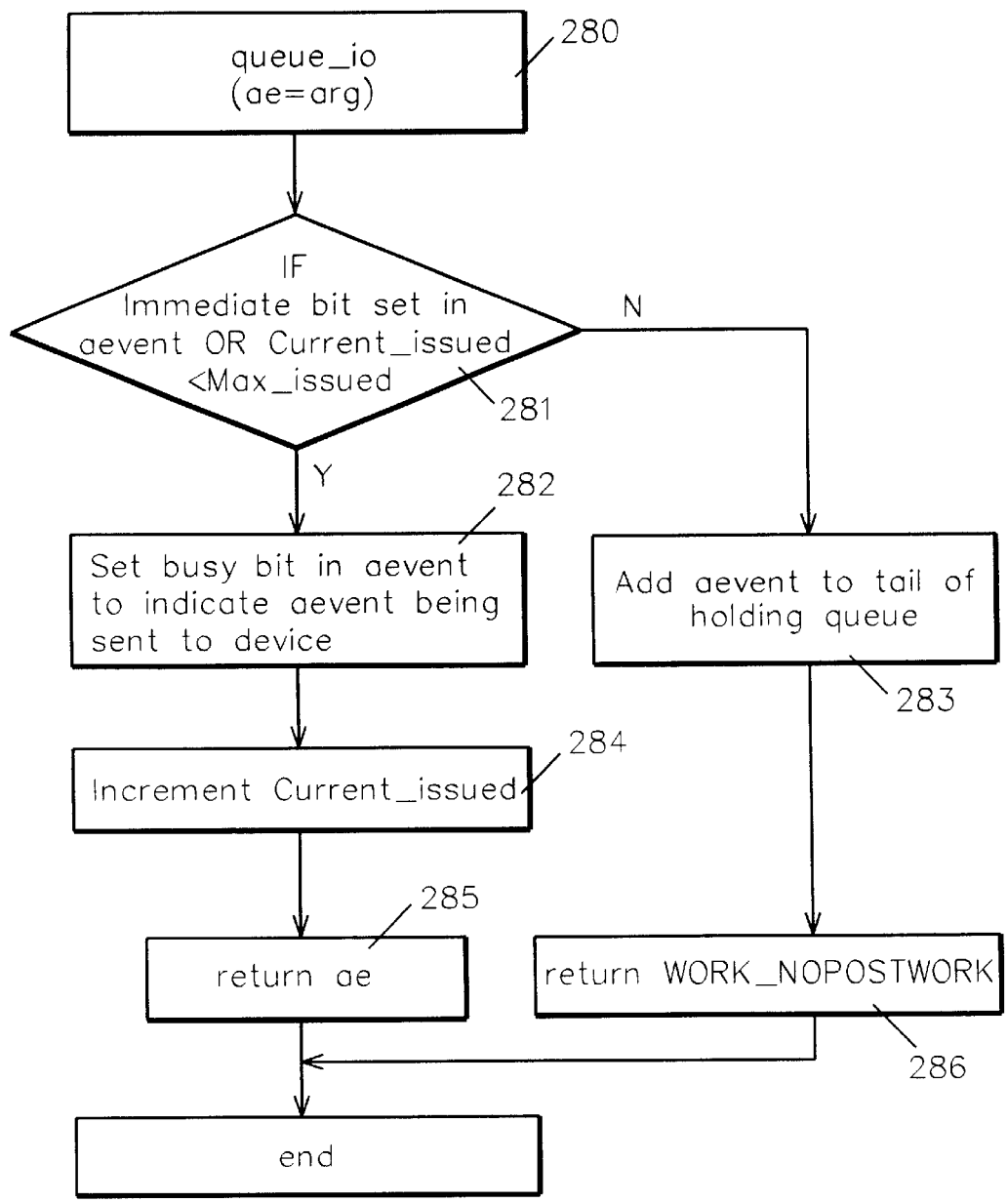
FIG. 18 is a flow diagram of the queue_io routine.

Referring to FIG. 18, queue_io routine 280 (with ae=arg) includes step 281 in which is tested whether the immediate bit is set in this aevent or current issued_288 is less than max_issued 287. If either if these is true, in step 282 busy bit in aevent is set to indicated aevent is being sent to the I/O device; in step 284 current_issued 288 is incremented; and in step 285 ae is returned to the caller application. If test 281 is not true, then in step 283 this aevent is added to the tail of holding queue 270; and in step 286 WORK_NOPOSTWORK return code is returned to the caller application.

Thus queue_io 280 only updates queue 270 and/or Current_Issued count 288. It does not actually schedule the I/O (which takes a lot of pathlength) but rather it passes the address of the aevent structure to the post processing routine issue_io 290. If it only adds an I/O to holding queue 270, it short circuits the issue_io routine 290 by returning WORK_NOPOSTWORK.

Figure 19:
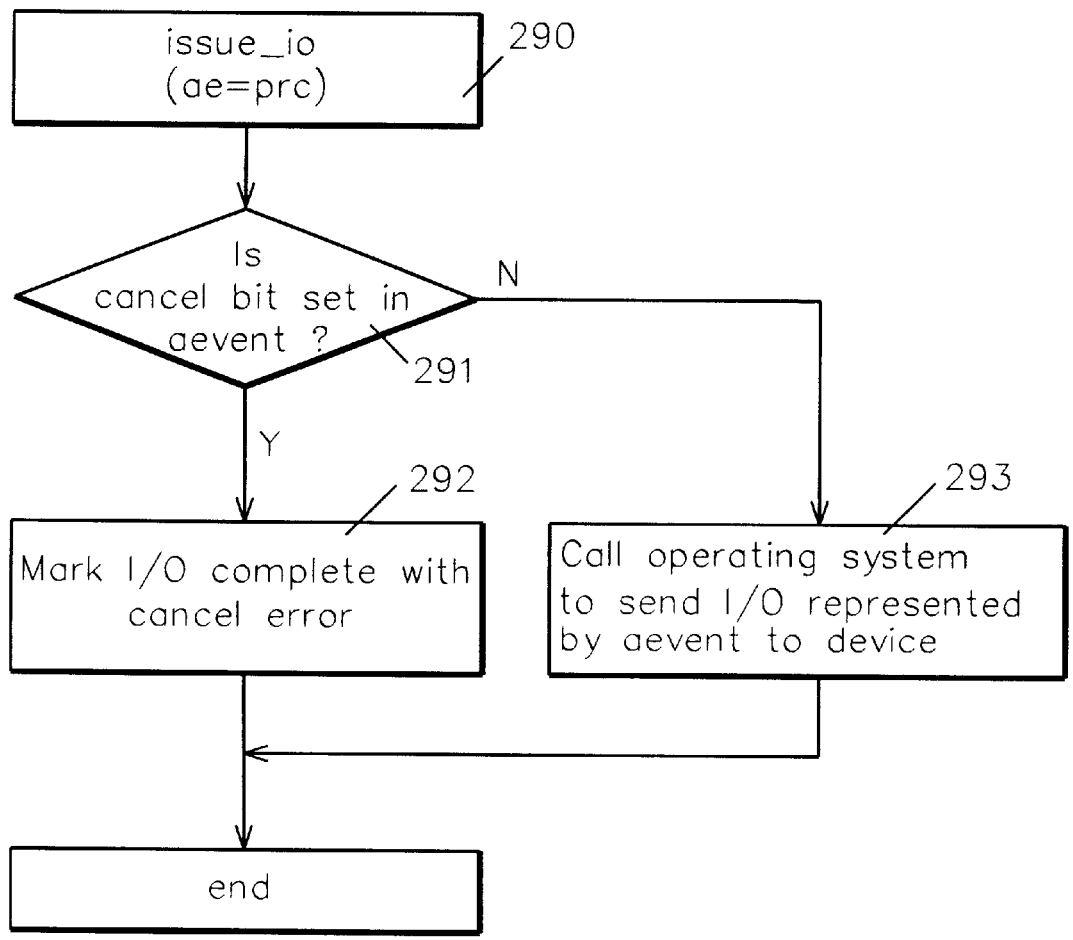
FIG. 19 is a flow diagram of the post processing issue_io routine.

Referring to FIG. 19, issue_io routine 290 (with ae=prc) is a post processing routine. It is not run while holding the lock, so lock contention is reduced (significantly) on the device queue. Step 291 determines if the cancel bit is set in this aevent (say, 273); if so, in step 292 the I/O is marked complete with cancel error; and if not, the operating system is called in step 293 to send the I/O represented by this aevent 273 to the I/O device.

Figure 20:
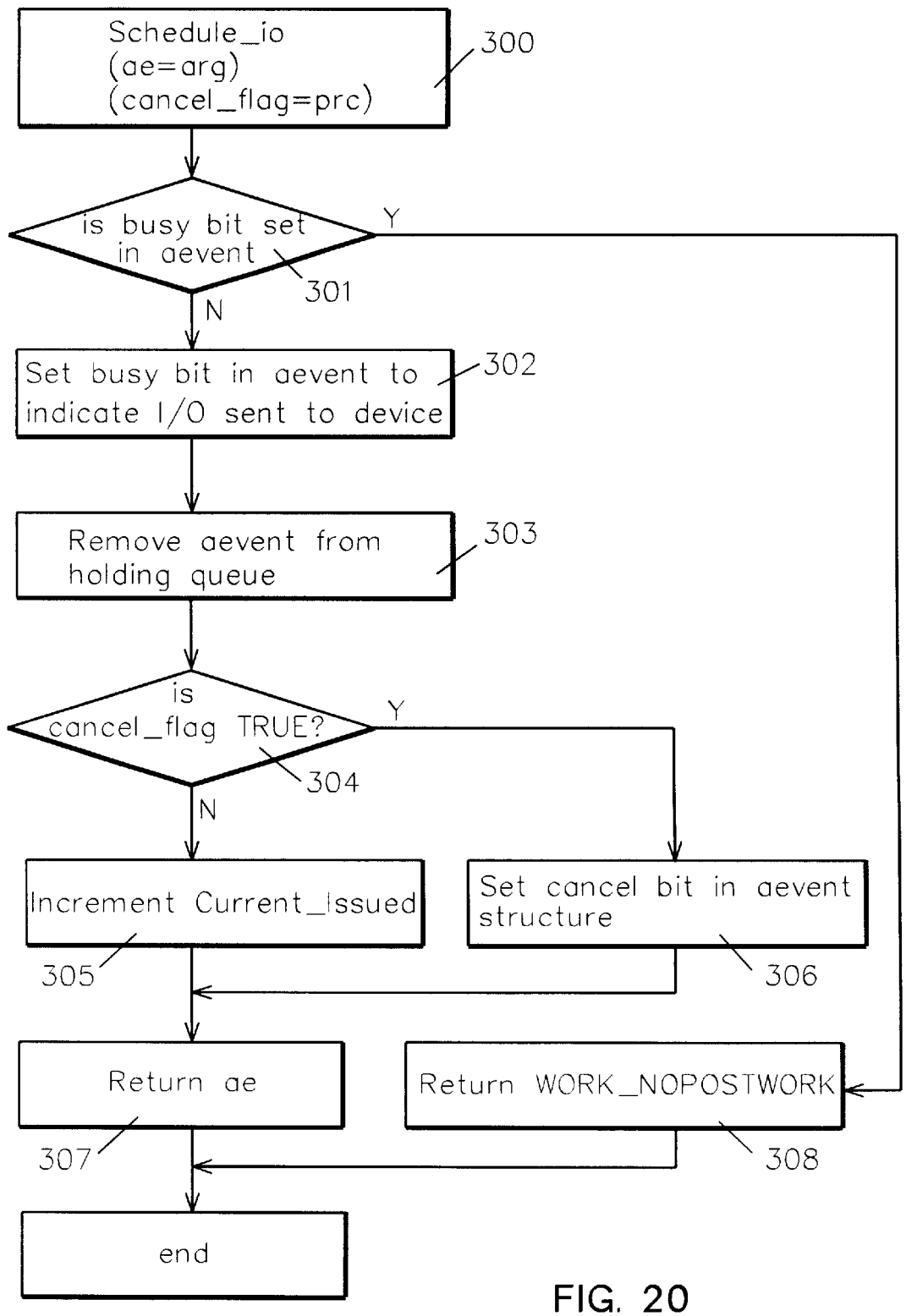
FIG. 20 is a flow diagram of the resource update routine schedule_io.

Referring to FIG. 20, schedule_io 300 is a resource update routine that uses both of its arguments (the address ae of the aevent structure and a cancel flag prc indicating if the caller wants the I/O canceled rather than issued). If the I/O has already been sent to the device, there is nothing to do, but if it hasn't it is removed from the holding queue and Current_Issued 288 is incremented if cancel is not desired. Again, issue_io 290 is bypassed if there is no I/O to issue. Step 301 determines if a busy bit is set in the aevent (say, 275) pointed to by ae; if so, there is nothing to do, and step 308 returns WORK_NOPOSTWORK; if not, step 302 sets the busy bit; step 303 removes aevent 275 from holding queue 270; and step 304 determines if cancel_flag is true. If cancel flag is true, step 306 sets the cancel bit in aevent structure 275 and step 307 returns ae to the caller; if not true, current issued 288 is incremented before returning ae.

Figure 21:
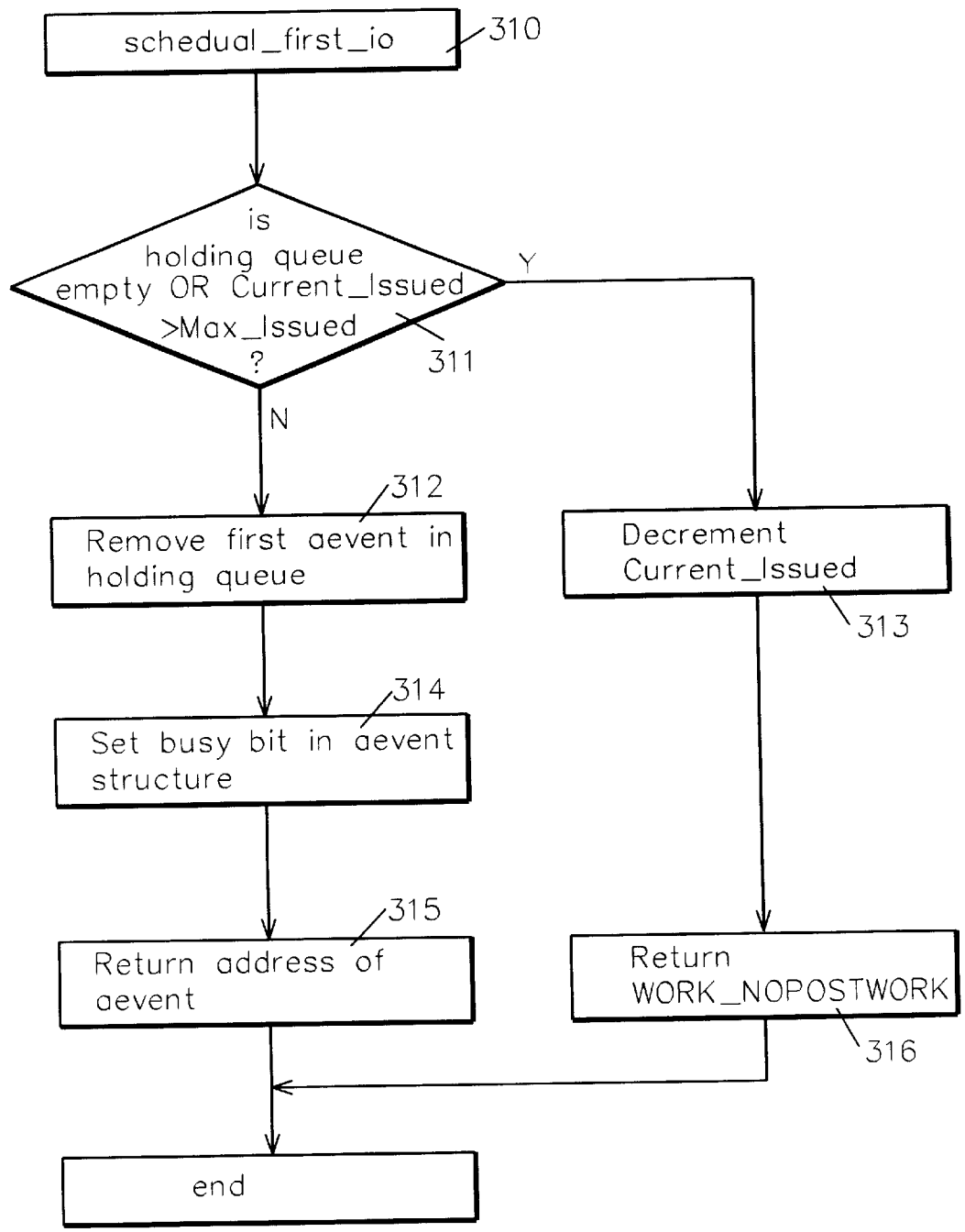
FIG. 21 is a flow diagram of the schedule_first_io routine.
Figure 22:
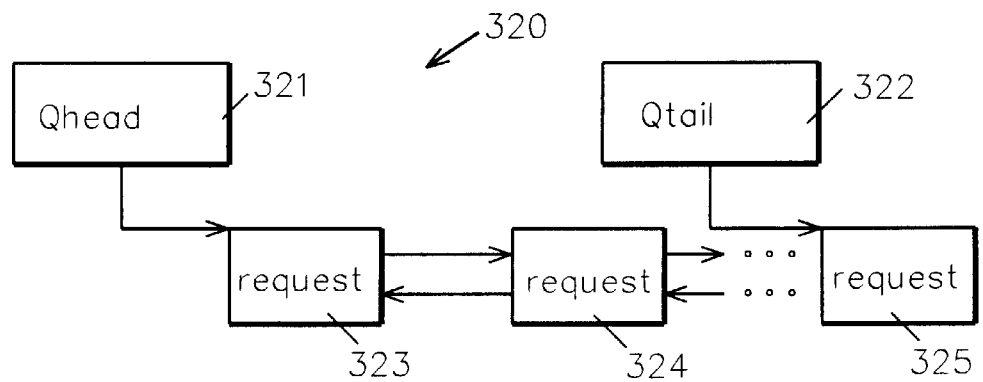
FIG. 22 is a diagram illustrating a holding queue of requests.
Figure 23:
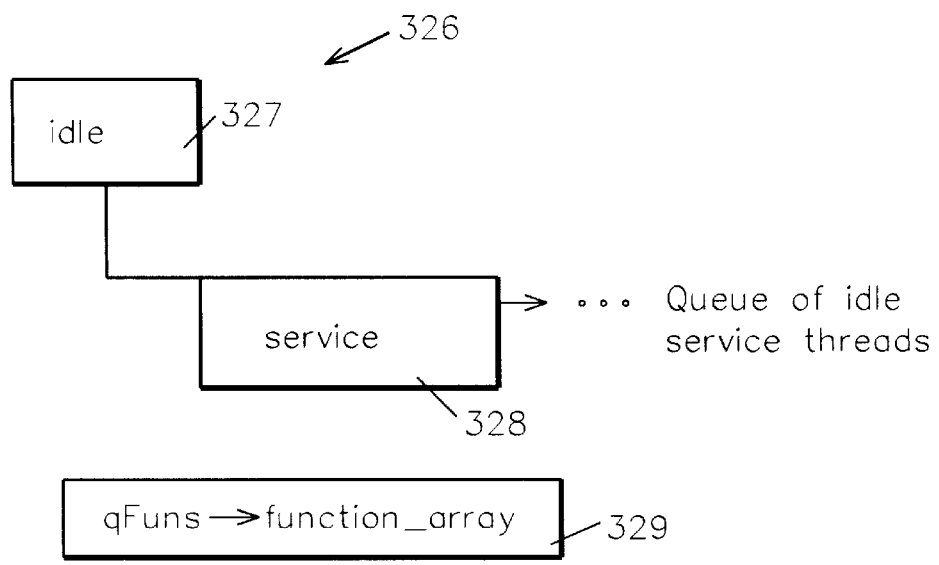
FIG. 23 is a diagram illustrating a queue of idle service threads.

Referring to FIG. 21, schedule_first_io 310 includes step 311, which determines if holding queue 270 is empty or if current_issued 288 is greater than max_issued 287. If either condition is true, step 313 decrements current_issued 288 and step 316 returns WORK_NOPOSTWORK to the caller. If both conditions are false, step 312 removes the first aevent from holding queue 270; step 314 sets the busy bit in the aevent structure; and step 315 returns the address of the removed aevent structure to the caller.

Example 3

Managing a Pool of Service Threads With an Asynchronous Lock

Referring to FIGS. 22 through 28, a finite pool of tasks exist which can service work requests from client threads, work must run on a service thread for some reason or another (specific to application), and requests are to be handled first come first served. In this example, client threads can either wait for a request to be finished or not (which means that requests may be either asynchronous or synchronous). There can be any number of client or service threads, which is up to the application. Specifically, for example, in the IBM DFS/MVS product, user tasks call DFS to make file requests. Because these file requests cannot run under the calling task due to a variety of reasons, a service task must pick up the user file request and run it. Thus, a finite pool of service threads exists, and some number of user tasks (approximately equal to the number of user processes calling DFS at one time) need to be dispatched on a service task.

In this example, a lock is defined and list 326 of idle service threads 328 and request queue 320 for client requests 323–325 is provided. Request queue 320 is anchored by Qhead 321 and Qtail 322, and service thread 326 is anchored by idle 327. Each service structures 328 represents one idle service tasks, and it may also point to a current request attached to that service task.

Data structure 323 contains information relevant to the client request and data structure 328 represents a service thread. A service task add its service structure 328 to idle list 326 upon checking request queue 320 and finding it empty. When a client request comes in, it first checks idle list 326 to see if there is an available service thread 328, and if not then queue the request in request queue 320. Updating queue 320 does not require any task suspension or switching. There is a task switch between client and service thread, but that is required. Updates to queue 320 does not entail any task suspension, unlike prior art methods of putting a heavy duty suspension lock around the queue.

In this example, there are two types of tasks: client tasks and server tasks. In this case, providing multiple tasks is used for more than just different programming languages or execution environments as in previous examples, but is required by the actual asynchronous update routines to ensure proper functioning. Actually the code is the same, so although the function array is 3×2, the functions for both type of tasks (CLIENT and SERVICE) are, in this example, identical, which is how the processes described hereafter in connection with FIGS. 24–28 are implemented.

The resource update routines are as follows:

queue_request 340 is called by client tasks to dispatch a request onto a service thread 328 if one is available or add the request to request queue 320.

post_service_thread 348 wakes up the sleeping service thread 328 if an idle service thread is found by queue_request 340. This is a post processing routine not run under the lock so as to minimize lock contention.

get_next_request 350 removes the oldest (first) request 323 in FIFO request queue 320 (assuming requests are added to the tail of the queue). This request 323 would be run after a service thread finishes processing a request but before it goes back to sleep (in case the service thread will find that there is more work on request queue 320 to run). Request 323 checks to see if its running synchronously on a calling service thread to avoid unnecessary WAIT calls.

In this example there are 3 update routines and 2 task types, making a 3×2 array 329 of functions to handle the updates.

Figure 24:
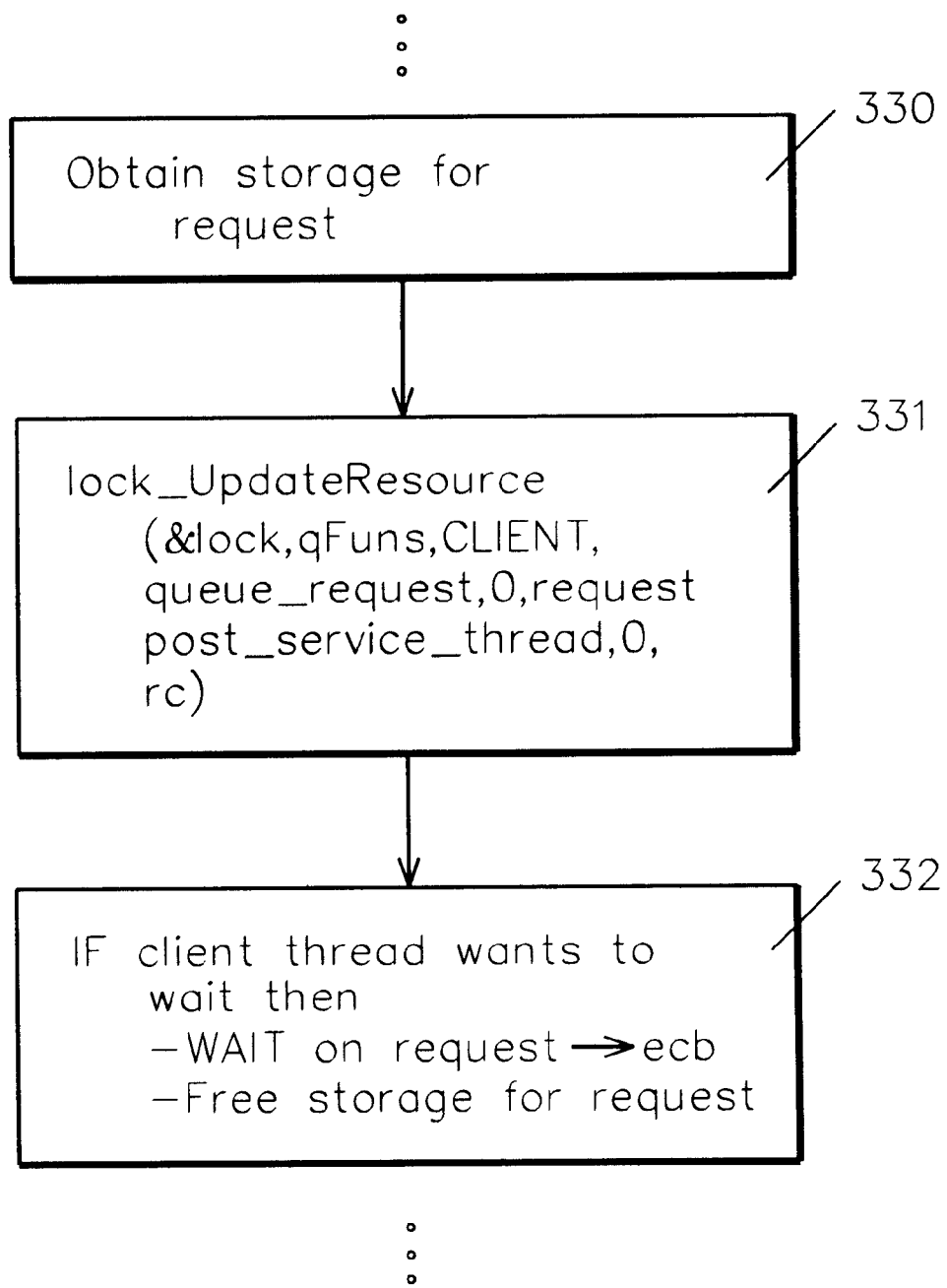
FIG. 24 is a diagram illustrating the flow of execution for a client thread.

Referring to FIG. 24, the flow of execution for a client thread includes in step 330 obtaining storage for this request; and in step 331 executing the procedure:

lock_UpdateResource(&lock, qFuns, CLIENT, queue request, 0, request post service_thread, 0, rc);

If this client thread wan-s to wait then in step 332 it WAITs on request→ecb and, upon receiving it, frees storage obtained for this request in step 330.

Referring to FIG. 25, the flow for a service thread is illustrated by the code of step 335. Service threads 328 run forever until program end, and are run based upon a call which includes the address of this thread's service block. Step 335 comprises:

Do forever:
    service→request=0
    service→ecb=0
    rc=lock_UpdateResource(&lock, qFuns, SERVICE, get_next_request, 0, service, post_service_thread, 0, rc)
    if rc !=WORK_SYNC OR service→request is 0
        WAIT on service→ecb
    <Process service→request>

In the code of step 335, the importance of the lock_UpdateResource return code (rc) is shown. If the get_next_request was run on the calling thread (the service task), then it checks to see if it has a request; if not then it goes to sleep (WAIT); otherwise, it runs the request. While this is not required, it reduces unnecessary waits.

Figure 26:
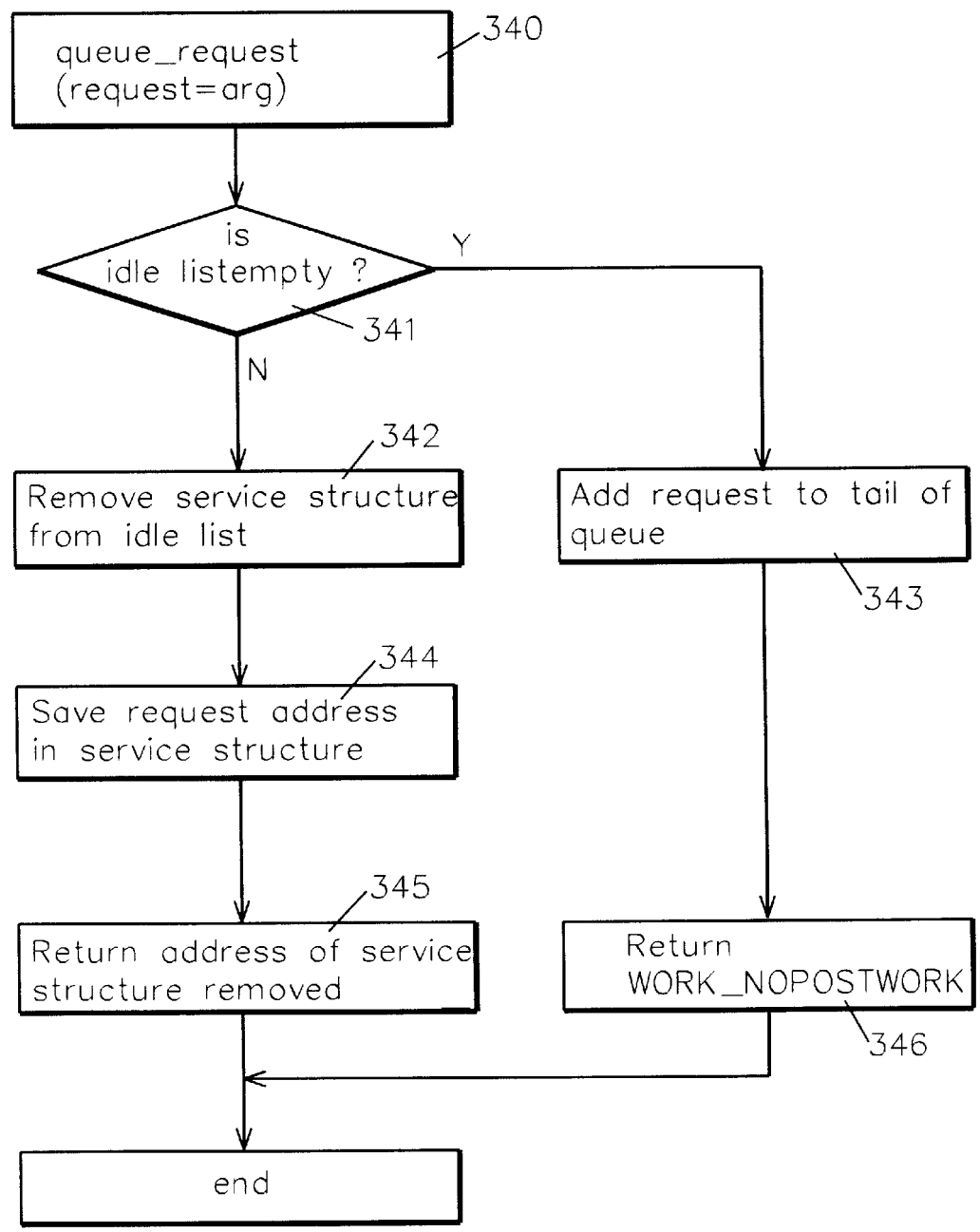
FIG. 26 is a flow diagram illustrating the update routine queue_request.

Referring to FIG. 26, the update routine queue_request 340 (with request=arg) includes step 341, which determines if idle list 328 is empty; if so, in step 343 this request 325 is added to the tail of request queue 320; and in step 346 WORK_NOPOSTWORK is returned to the caller. If idle list 328 is not empty, in step 342 a service structure 328 is removed from idle list 326; in step 344 the address of this request is saved in the service structure; and in step 345 the address of the removed service structure is returned to the caller. In summary, this routine 340 adds the request to request queue 320 if there are no idle service threads 328 and returns WORK_NOPOSTWORK which tells the asynchronous update facility not to run a post processing routine. If an idle service thread 328 is found, it is removed and the post processing routine post_service_thread 348 will be called by the asynchronous update facility.

Figure 27:
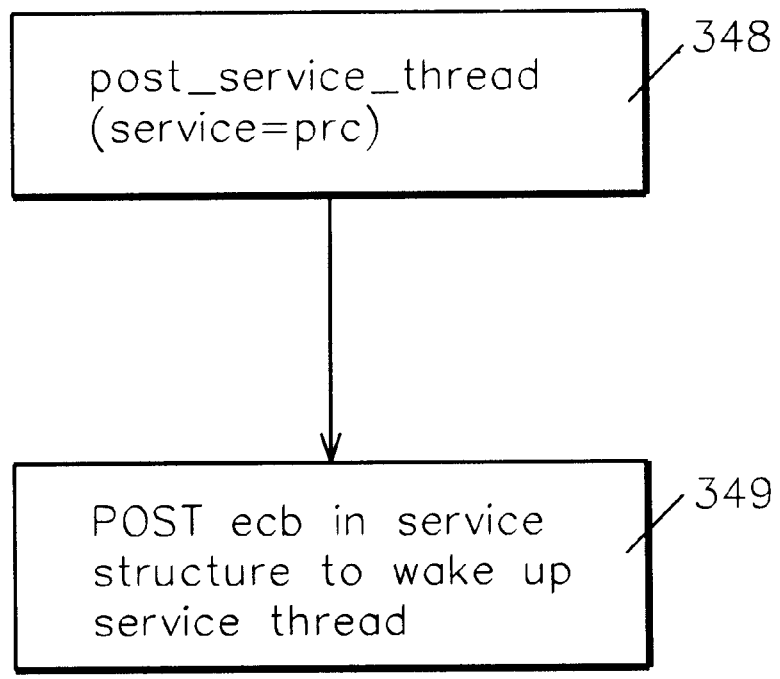
FIG. 27 is a flow diagram illustrating the update routine post_service_thread.

Referring to FIG. 27, the update routine post service thread (with service=prc) 348 in step 349 posts ecb in the service structure to wake up the service thread 328.

Figure 28:
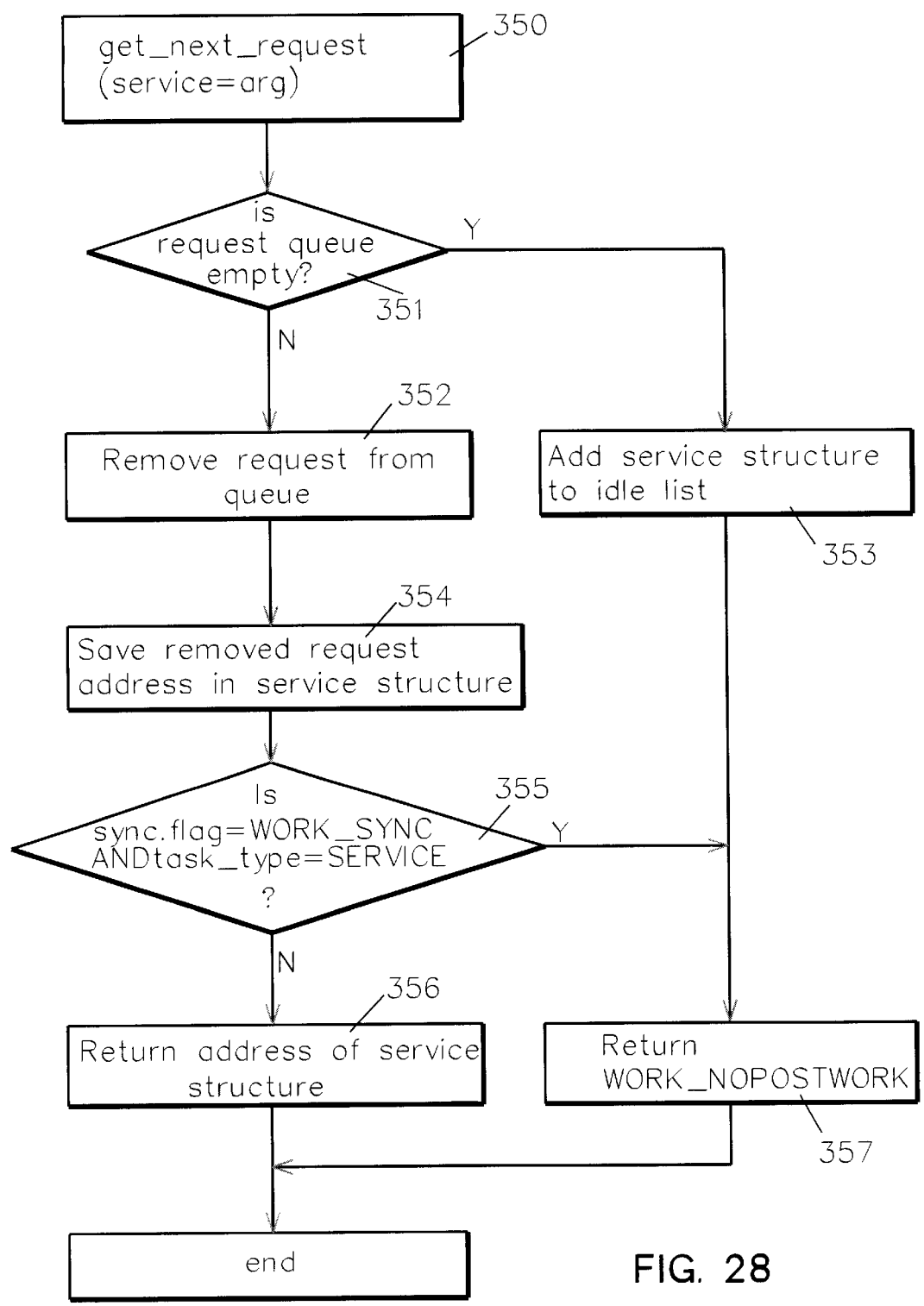
FIG. 28 is a flow diagram illustrating the update routine get_next_request.

Referring to FIG. 28, the update routine get_next_request (service=arg) 350 first determines in step 351 if request queue 320 is empty. If queue 320 is empty, this service structure is added to idle list 326 and WORK_NOPOSTWORK is returned to the caller. If queue 320 is not empty, in step 352 the next request is removed from queue 320; and in step 354 the removed request address is saved in the service structure. Step 355 determines if sync.flag= WORK_SYNC AND task_type=SERVICE; if so, in step 357 WORK_NOPOSTWORK is returned to the caller; otherwise, in step 356 the address of the serviced structure is returned. Both the sync_flag and task_type parameters that are automatically passed to the update routines by the asynchronous update facility are used. Get_next_request 350 code checks to see if it is running on a service thread (not a client task), and if it is and it is being run synchronously, it bypasses calling the post processing routine post_service_thread 348 since it just grabbed the first request off queue 320. The request address is saved in the service structure. The service thread checks the lock_UpdateResource return code and in this case will see the work was done synchronously and will avoid an unnecessary WAIT call (which is somewhat expensive).

In summary, the use of the asynchronous update facility eliminates waiting to update the idle list or the request queue which would have occurred had a formal suspend (prior art) been used to protect those lists whenever there was contention for the list. Since those queues are updated for every request, contention could have occurred fairly often.

Example 4

Returning Objects to a Shared Pool

This final example shows the use of combining the asynchronous resource update facilities with standard synchronous locking to reduce lock contention and task waits for locks.

In general, there is a class of problems where there is some pool of some type of resource, and a task requiring an object from the pool cannot continue processing until it gets it. In this case, a formal suspend type lock requiring synchronous processing must be used. However, when such a task is done with the object, synchronous processing is not required to return it to the pool, and the asynchronous resource update facility of the invention can be used. In this situation asynchronous resource update is combined with the standard locking mechanisms, which perform synchronous resource update, to reduce lock contention and task waits.

In the DFS/MVS environment, clients are allowed to cache file status and data from DFS file servers. They do this by obtaining tokens that represent the right to cache data. In the DFS/MVS file server, code exists to cache tokens, each file may have more than one token, and each client may have more than one file for which it has tokens. Specifically, DFS/MVS has a token cache for SMB clients, it has a structure that represents a file and a structure that represent a token. The file structures are kept in a pool which is bounded in size, and LRU reuse schemes are used to re-assign a file structure to a different file by using least recently used schemes when all file structures are currently assigned to files.

Figure 29:
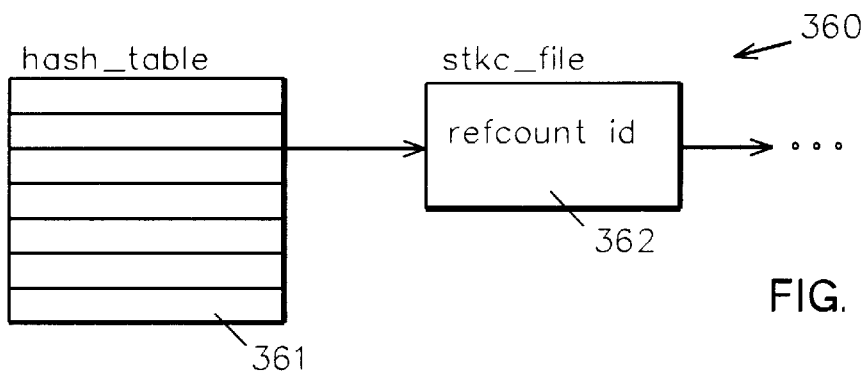
FIG. 29 is a diagram illustrating a hash table.
Figure 30:
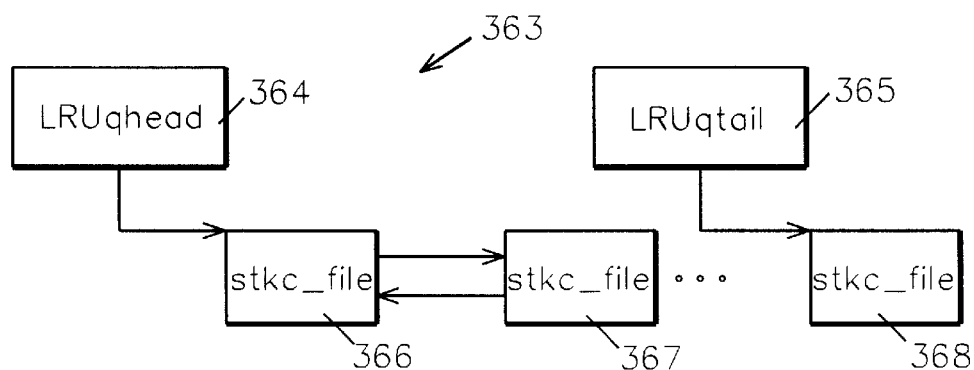
FIG. 30 is a diagram illustrating an LRU structure queue.
Figure 31:
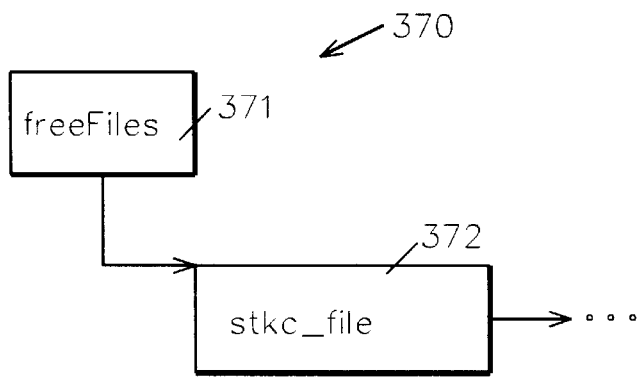
FIG. 31 is a diagram illustrating a queue of free structure files.
Figure 31:
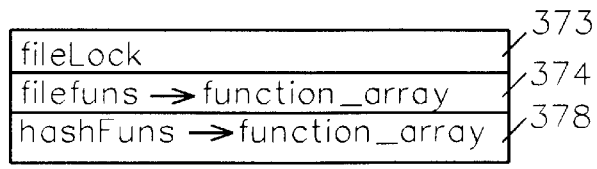

Referring to FIGS. 29–31, the SMB token cache 360 has a hash table 361 that is used to quickly find a file structure (stkc_file) 362 based on a file identifier. It also has a free list 370 of file structures 372 that are not assigned to any file and an LRU structure queue 363 of file structures 366–368 that are currently assigned but could be re-assigned to another file identifier if necessary. Queue 363 is anchored by LRU-qhead 364 and LRUqtail 365.

The stkc_file structures 366, 372 represent files, and files in DFS are known by their identifiers (a sequence of numbers). An SMB token cache maintains a mapping and cache of files, each stkc_file structure 366, 372 has a list of tokens held for that file and a refcount field which represents the number of tasks that are currently referring to the file.

Hash table 361 is used for quick lookup of a stkc_file based on the DFS file identifier. Each row in the hash table has a lock to protect access to hash table rows, and there are global fileLocks for updating the refcount field, LRU queue 363 and free list queue 370.

The code for finding (obtaining) an stkc_file structure 366, 372 for a given file identifier is not described here since that uses synchronous locking techniques. The asynchronous code for indicating a task is done with an stkc_file structure is described.

A stkc_file refcount is incremented for each task referring to the stkc_file, and it is decremented when each task is done referring to the file. The stkc_file_put routine which decrements the refcount and takes action based thereon is as follows:
IF the refcount is now 0:
    IF there are tokens held for file THEN
        add the file to the LRU queue
    ELSE
        remove file from hash table and add it to free list.

There is no reason to cache an stkc_file for a file identifier if the cache has no tokens for the file. If it does have tokens then it simply keeps the file in an LRU queue because the file can be reassigned to another file identifier. If the refcount is not 0, there are other tasks using the stkc_file so no action is taken. Since this processing may update hash table 361, the hash row lock for the list that contains the stkc_file must be locked, and since the free list 370 or LRU queue 363 may be updated the fileLock must be held. Thus two locks are needed, this example shows the use of the asynchronous update facility of the invention to obtain the two locks needed to update resources and yet still eliminate the possibility of task suspension.

There is only one task type (all are C tasks), but there are two function arrays. HashFuns contains only one update routine.

hash_put 380 is main routine to indicate a task is done with a stkc_file. This is outer routine, it only has the hash table lock when running.

file_put 385 is the inner routine to indicate a task is done with a stkc_file. When it runs both hash table and main fileLock locks are held.

file_postwork 395 is the routine used to release the hash row lock.

The special return code WORK_DONTUNLOCK is used by hash_put to guarantee that the lock is not released in case the file_put routine 385 is being run asynchronously on another thread. File_postwork 395 is used to ensure the hash row lock is released to avoid deadlock. Thus nested asynchronous locking is being performed without task suspension.

Figure 32:
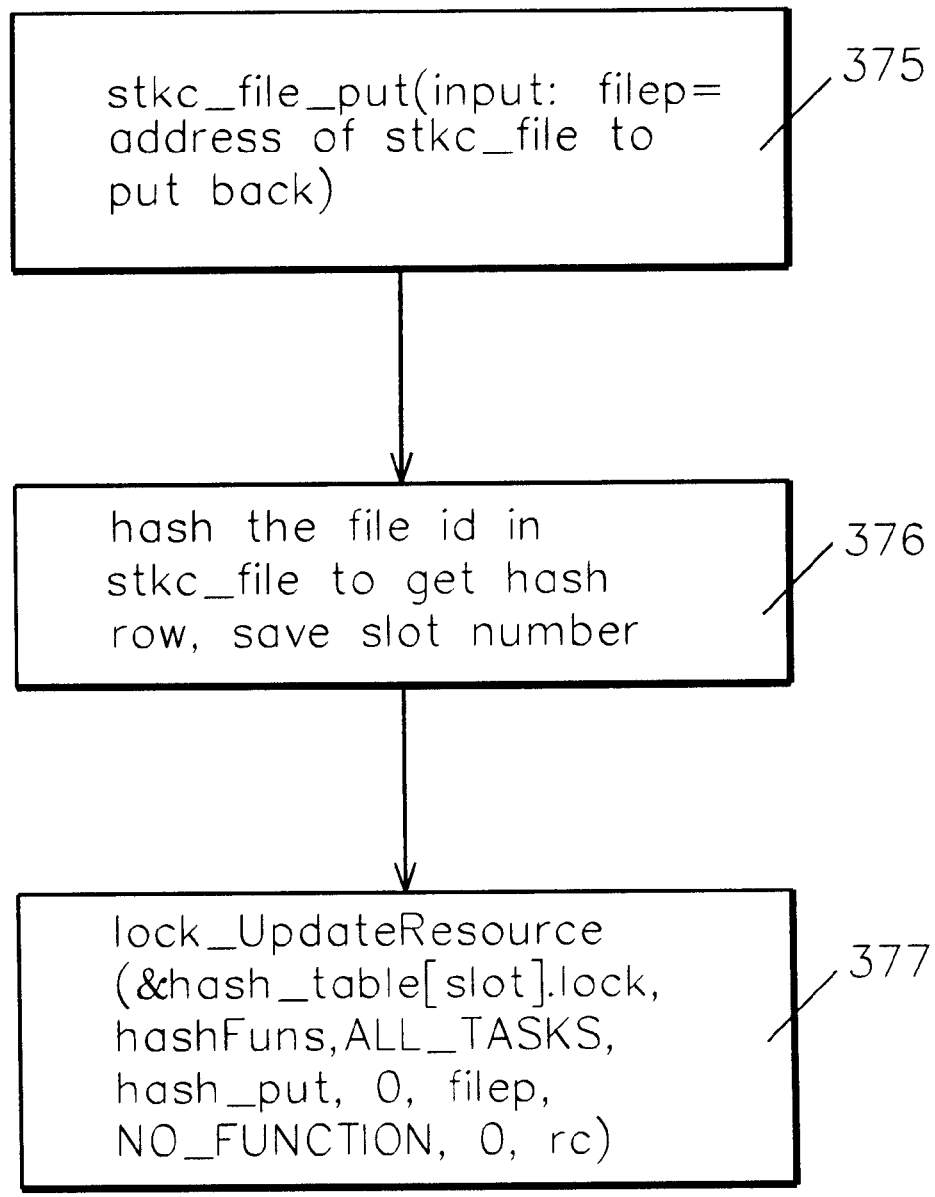
FIG. 32 is a flow diagram of the stkc_file_put routine.

Referring to FIG. 32, stkc_file_put receives as input filep, representing the address of the stkc_file to put back. In step 376 the file id in stkc_file is hashed to get the h ash row; and the slot number is saved. Step 377 executes function:
    lock_UpdateResource(&hash_table[slot].lock,
        hashFuns,ALL_TASKS,hash_put,0,filep,NO_FUNCTION,0,rc);
This runs hash_put after first determining which hash table row the file is contained in.

Figure 33:
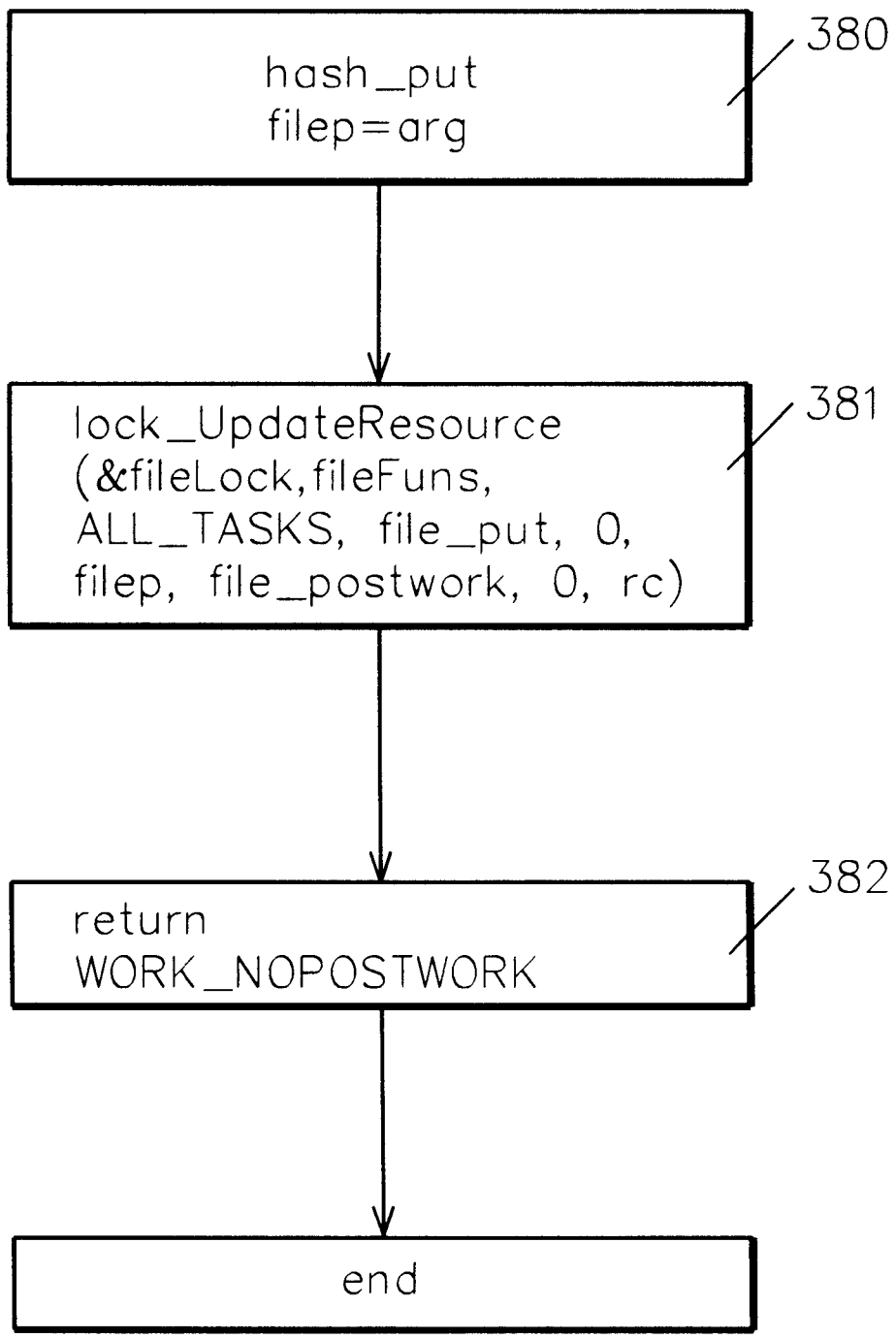
FIG. 33 is a flow diagram of the hash_put routine.

Referring to FIG. 33, hash_put (filep=arg) 380, in step 381 executes :
    lock_UpdateResource(&fileLock,fileFuns, ALL_TASKS,file_put,0,filep,file_postwork,0,rc);
and in step 382 returns WORK_NOPOSTWORK. Thus, hash_put runs the routine for file_put (which implies file_put runs while filelock is held) and returns a WORK_NOPOSTWORK indication to the asynchronous update facility to not release the lock since file_postwork will do this. This is necessary in case file_put is run on a separate task; if it is, then when hash_put returns it must guarantee the lock is still held for the other task that will run file_put.

Figure 34:
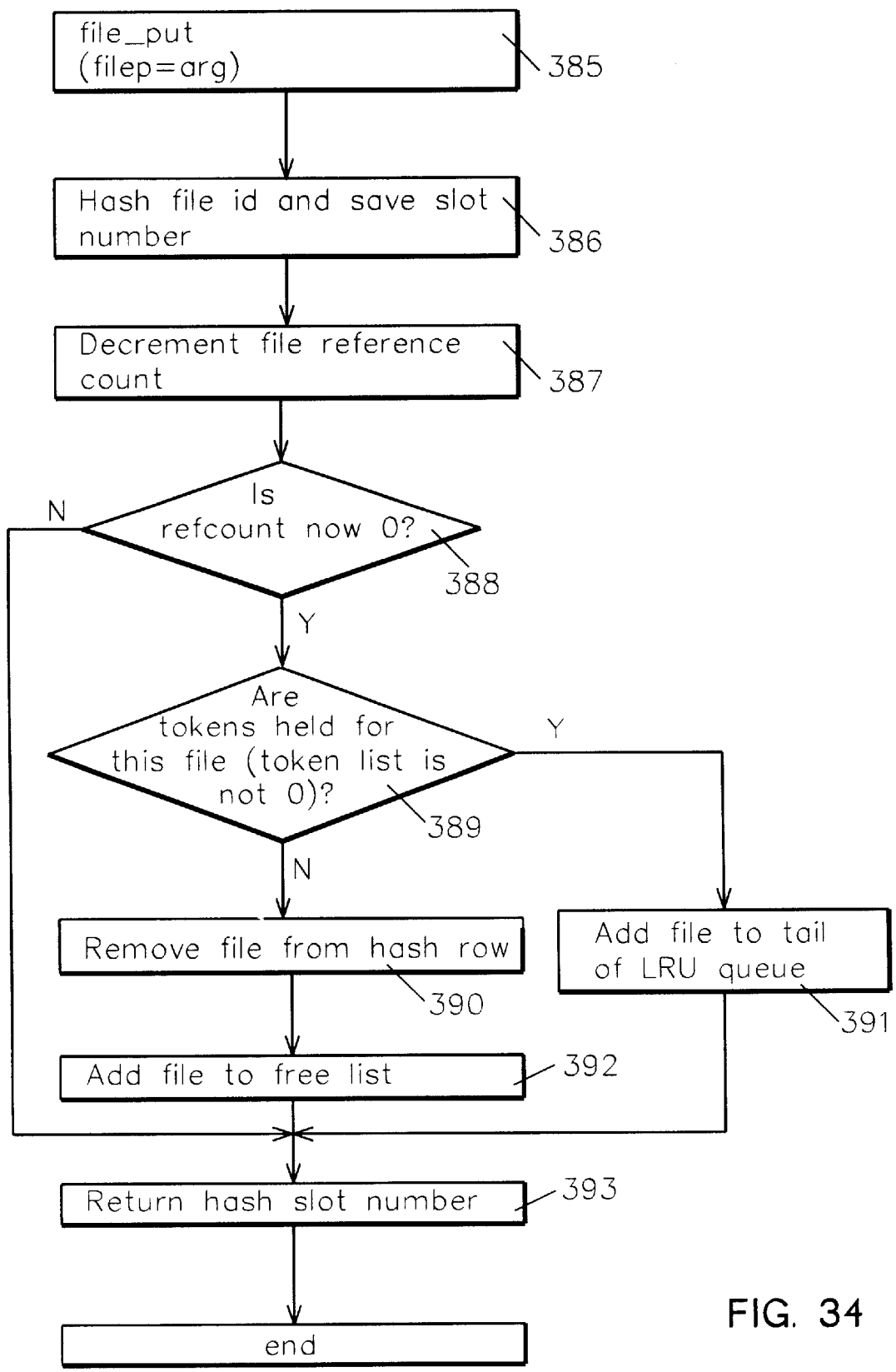
FIG. 34 is a flow diagram of the file_put routine.

Referring to FIG. 34, file_put (filep=arg) routine 385 in step 386 hashes the file identifier and saves the slot number; and in step 387 decrements the file reference count. Step 388 determines if the file reference count is now zero, and if not in step 393 returns the hash slot number to the caller, and exits. If the file reference count is not zero, step 389 determines if tokens are held for this file, and if so, in step 391 adds this file to the tail of LRU queue 363. If tokens are not held for this file, step 390 removes the file from the hash row and step 392 adds the file to the free list 370. Step 393 returns the hash slot number and exists.

File_put routine 385 does all the necessary work. It also returns the hash slot number so file_postwork 395 knows which hash row lock to release. When file_put 385 is running it is guaranteed by the asynchronous update facility that both hash row and fileLock are held exclusive. The fileLock is released when file_put 385 returns.

Figure 35:
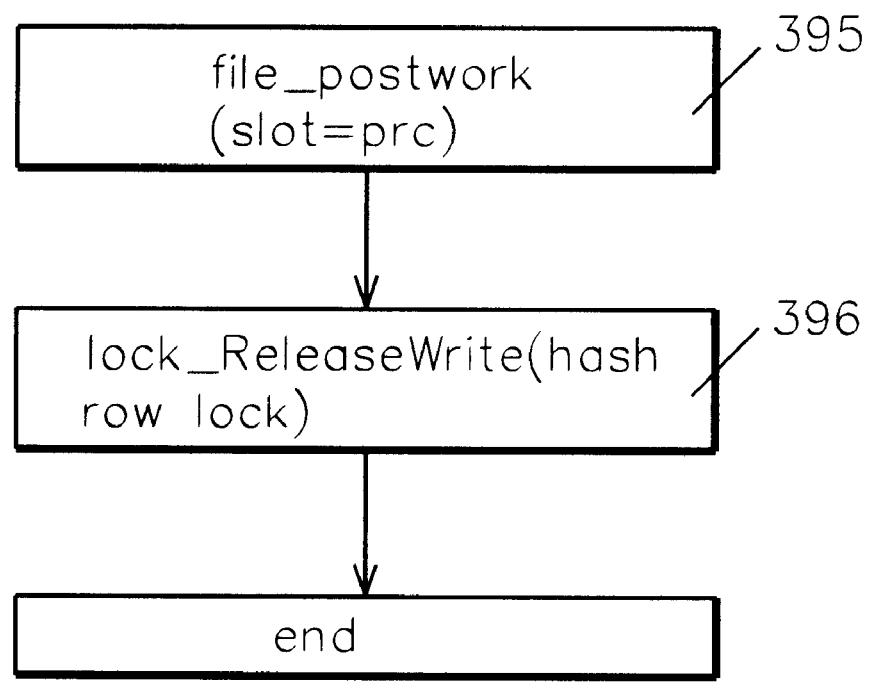
FIG. 35 is a flow diagram of the file_postwork routine.

Referring to FIG. 35, file_postwork (slot=prc) 395 is run while not holding the fileLock, and in step 396 releases the hash table row lock.

In summary, this example shows the need for the WORK_DONTUNLOCK return code and shows how complex nesting of asynchronous resource update routines can be performed.

Example 5

Trace Table

A trace table may be updated via asynchronous locks. Trace tables are repeatedly updated by tasks as they do their work. The contention on a trace table if it had a heavy weight lock would be large and performance would be degraded. By using the asynchronous resource update facility of the invention, a programmer may design a trace facility to put a bound on the queuing allowed on the trace table lock to ensure a thread was not overloaded (should rarely, if ever, in practice occur) by specifying a Max_Queued value on the lock_Init call for the trace table.

Advantages over the Prior Art

It is an advantage of the invention that there is provided an improved system and method for managing locks.

It is a further advantage of the invention that there is provided a system and method for managing locks with improved performance.

It is a further advantage of the invention that there is provided a system and method for managing locks which avoids formal task suspension or CPU spins.

It is a further advantage of the invention that there is provided a system and method for managing locks which avoids costly lock contention overhead.

It is a further advantage of the invention that there is provided a system and method for managing locks both synchronously and asynchronously.

Alternative Embodiments

It will be appreciated that, although specific embodiments of the invention have been described herein for purposes of illustration, various modifications may be made without departing from the spirit and scope of the invention. In particular, it is within the scope of the invention to provide a program storage or memory device such as a solid or fluid transmission medium, magnetic or optical wire, tape or disc, or the like, for storing signals readable by a machine for controlling the operation of a computer according to the method of the invention and/or to structure its components in accordance with the system of the invention.

Further, each step of the method may be executed on any of general computer, such as an IBM System 390, AS/400, PC or the like and pursuant to one or more, or a part of one or more, program modules or objects generated from any programming language, such as C++, Java, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. A method for allowing applications including an asynchronous locking facility to update a resource via locking without task suspension or task switching, comprising the steps of:
   queuing a request to update a resource requested by a first task onto a lock for said resource; and
   operating a second task holding said lock on said resource to execute said request before releasing said lock.

2. The method of claim 1, further comprising the steps of:
   providing a plurality of two or more update routines for updating said resource, including a first update routine and a second update routine;
   said second task executing said first update routine before releasing said lock; and
   selectively executing said second update routine after said second task has released said lock;
   thereby reducing lock contention.

3. The method of claim 2, further comprising the step of:
   passing a return code from said second task to said asynchronous locking facility.

4. The method of claim 3, said return code being a work_nopostwork return code for bypassing execution of said second update routine.

5. The method of claim 3, said return code being a work_dontunlock return code for complex nesting of asynchronous locks.

6. The method of claim 2, further comprising the step of:
   specifying a plurality of task types for executing said update routines;
   thereby selectively enabling multi-program language environments and multi-execution environment environments, and partitioning of tasks into logical classes.

7. The method of claim 6, further comprising the step of:
   selectively passing a task_type parameter to tasks executing said update routines, said task_type parameter specifying the type of task on which said tasks are running.

8. The method of claim 2, further comprising the step of:
   passing one or more user parameters from said application to said update routines.

9. The method of claim 2, further comprising the steps of:
   selectively executing a lock_Resource macro or an unlock_Resource macro; and
   responsive to obtaining or releasing a lock in exclusive mode without contention, returning a work_inline return code instructing the caller to run post processing code in line.

10. The method of claim 1, further comprising the step of:
    passing a sync_flag parameter from said asynchronous locking facility to tasks executing said requests, said parameter specifying whether said tasks are running on a calling thread or asynchronously on another thread.

11. The method of claim 1, further comprising the step of:
    responsive to an application supplied maximum, restricting the number of requests for asynchronous updates queued on said lock.

12. The method of claim 1, further comprising the step of:
    queuing a plurality of update requests on said lock from a plurality of tasks for sequential execution in queued order by said second task.

13. A method for allowing applications including an asynchronous locking facility to update a resource via locking selectively synchronously, or asynchronously without task suspension or task switching, comprising the steps of:
    selectively queuing a request to update a resource requested by a first task onto a lock for said resource; and
    selectively operating a second task holding said lock on said resource to execute said request before releasing said lock.

14. A program storage device readable by a machine, tangibly embodying a program of instructions executable by a machine to perform method steps for allowing applications including an asynchronous locking facility to update a resource via locking without task suspension or task switching, said method steps comprising:
    queuing a request to update a resource requested by a first task onto a lock for said resource; and
    operating a second task holding said lock on said resource to execute said request before releasing said lock.

15. An article of manufacture comprising:
    a computer useable medium having computer readable program code means embodied therein for allowing applications including an asynchronous locking facility to update a resource via locking without task suspension or task switching, the computer readableprogram means in said article of manufacture comprising:
    computer readable program code means for causing a computer to effect queuing a request to update a resource requested by a first task onto a lock for said resource; and
    computer readable program code means for causing a computer to effect operating a second task holding said lock on said resource to execute said request before releasing said lock.

16. A interface system for enabling asynchronous updating of a shared resource, comprising:
    a plurality data structures for defining resource update requests; and
    a wait queue for queuing data structures describing update requests awaiting execution by a current task, other than the calling task, currently holding an exclusive lock on said shared resource.

17. The interface system of claim 16, further comprising:
    a taken queue for queuing data structures removed from said wait queue but not yet processed;
    an unlock queue for queuing data structures for requests to unlock or downgrade a lock;
    a return queue for queuing data structures for requests which have been processed and need to be returned to free storage; and
    a post queue for queuing data structures for requests that need to be awakened or that describe post processing routines that are to be run while said lock is not held.

18. The interface system of claim 16, said lock comprising:
    a state parameter field for storing state bits defining the said of said lock;
    a wait queue field for anchoring said wait queue; and
    a maximum queued field for specifying the maximum number of queued update requests allowed before asynchronous update calls will be made to wait.

19. The interface system of claim 16, the state parameter of said lock comprising:

first indicia (E) specifying whether said lock is held exclusive;

second indicia (W) specifying whether said wait queue is empty;

third indicia (L) specifying whether said lock is held in a higher priority state;

fourth indicia (P) specifying whether said maximum number of queued update requests allowed has been exceed; and fifth indicia (R) specifying the number of said update requests on said lock.

20. The interface system of claim 16, said data structure comprising:

a next field for storing a forward pointer to a next data structure in a queue;

a previous field for storing a backward pointer to a previous data structure in a queue;

an wait field for specifying whether said data structure represents a task being made to wait;

an action field for specifying the action requested, said action being one of obtain lock, release lock, downgrade lock, upgrade lock, and work unit;

a type field for specifying the type of lock to obtain or release;

a work function field for accessing in an array of functions the function to run while holding a lock to update a resource;

a work process field for storing a first function argument for said resource update routine;

a work argument field for storing a second function argument for said resource update routine;

a work return code field for storing a return value of said resource update routine;

a function pointer field for accessing a function array;

a post work field for identifying in said function array a post processing function; and a post argument field for storing a post processing argument.

* * * * *